(12) United States Patent
Subramanian et al.

(10) Patent No.: US 7,028,197 B2
(45) Date of Patent: Apr. 11, 2006

(54) SYSTEM AND METHOD FOR ELECTRICAL POWER MANAGEMENT IN A DATA PROCESSING SYSTEM USING REGISTERS TO REFLECT CURRENT OPERATING CONDITIONS

(75) Inventors: Senthil K. Subramanian, Richardson, TX (US); Hung T. Nguyen, Plano, TX (US)

(73) Assignee: LSI Logic Corporation, Milpitas, CA (US)

( * ) Notice: Subject to any disclaimer, the term of this patent is extended or adjusted under 35 U.S.C. 154(b) by 531 days.

(21) Appl. No.: 10/420,581

(22) Filed: Apr. 22, 2003

(65) Prior Publication Data

US 2004/0215982 A1   Oct. 28, 2004

(51) Int. Cl.
*G06F 1/32* (2006.01)

(52) U.S. Cl. .................. 713/310; 713/320; 712/43; 712/205; 712/207; 711/169

(58) Field of Classification Search .............. None
See application file for complete search history.

(56) References Cited

U.S. PATENT DOCUMENTS

| | | | | |
|---|---|---|---|---|
| 5,663,715 A | * | 9/1997 | Godoroia | 340/825.2 |
| 5,790,877 A | * | 8/1998 | Nishiyama et al. | 713/323 |
| 5,996,083 A | * | 11/1999 | Gupta et al. | 713/322 |
| 6,308,236 B1 | * | 10/2001 | Lai | 710/305 |
| 6,363,490 B1 | * | 3/2002 | Senyk | 700/204 |
| 6,462,743 B1 | * | 10/2002 | Battle | 345/506 |
| 6,463,307 B1 | * | 10/2002 | Larsson et al. | 455/574 |
| 6,658,550 B1 | * | 12/2003 | Martin et al. | 712/23 |

* cited by examiner

*Primary Examiner*—Lynne H. Browne
*Assistant Examiner*—Anand B. Patel
(74) *Attorney, Agent, or Firm*—Conley Rose, P.C.

(57) ABSTRACT

A processor is disclosed including a register, functional unit(s), and a control unit. The register stores multiple bits, wherein one or more of the bits has a value representing a current electrical power dissipation mode (i.e., power mode) of the processor. The functional unit(s) respond to the power mode signal by altering their electrical power dissipation and issuing an acknowledge signal. The control unit receives a power mode input representing a request to enter a new power mode, and issues the power mode signal in response. The control unit waits for the acknowledge signal(s), and responds to the acknowledge signal(s) by modifying the one or more bits of the register to reflect the new power mode. A method is described for transitioning from a current power mode to a new power mode. A data processing system is disclosed including a peripheral device coupled to the processor.

21 Claims, 19 Drawing Sheets

SYSTEM AND METHOD FOR ELECTRICAL POWER MANAGEMENT IN A DATA PROCESSING SYSTEM USING REGISTERS TO REFLECT CURRENT OPERATING CONDITIONS

FIELD OF THE INVENTION

This invention relates generally to data processing, and, more particularly, to electrical power management in a data processing system.

BACKGROUND OF THE INVENTION

In general, an amount of electrical power dissipated by a processor during operation is directly proportional to the frequency of a clock signal used to synchronize internal processor activities. As processor clock signal frequencies continue to increase, processor power dissipation remains an important system design consideration. This is particularly true for battery powered electronic devices including processors such as portable computers and cellular telephones. A charged battery typically stores a fixed amount of electrical energy, and reducing power dissipation is essential to extending battery life.

In systems where a processor spends a significant amount of time waiting (e.g., for input or for another device to be ready to accept data), processor power dissipation may be reduced without significantly impacting performance by either reducing the frequency of the clock signal or putting the processor in a lower power dissipation state during the waiting periods.

Several processors implement a normal operating mode and at least one lower power dissipation operating mode. For example, some processors implement the normal mode and an idle mode and/or a halt mode. The processor normally operates in the Normal mode, and can be placed in the idle or halt mode (typically under software control). In both the idle and halt modes the state of the microcontroller may be maintained; that is, the contents of memory elements (e.g., registers) and the states of any output signals may be maintained. Normal mode operation is typically restored via a wakeup routine executed in response to external stimulus (e.g., an interrupt signal or assertion of a RESET signal).

For example, in the idle mode, all processor activities may substantially be stopped except clock signal generating circuitry and timer/counter circuitry. The timer/counter circuitry may be configured to generate an interrupt signal at regular time intervals, effectively "waking up" the processor at the regular time intervals. As a result, the processor dissipates significantly less power in the idle mode than in the normal mode.

One extremely useful application of such an idle mode is unattended data logging. For example, the timer/counter circuitry may be configured to generate an interrupt at the regular time intervals, and the processor may be placed in the Idle mode. In response to the interrupts, the processor may transition from the Idle mode to the normal mode, acquire and store data, and then transition from the normal mode to the idle mode. As a result, overall processor power dissipation is reduced.

In the halt mode, for example, all activities within the processor may be stopped including any timer/counter circuitry. As a result, the processor dissipates significantly less power in the halt mode than in the normal mode. An interrupt signal from an external device (such as via an input/output port) or assertion of the RESET signal may trigger a wake up routine that restores normal mode operation.

One example of an application of halt mode is in a computer system including a separate keyboard processor. For reduced power dissipation, the keyboard processor may be kept in the halt mode until an interrupt signal, generated in response to a keystroke, wakes up the keyboard processor. In response to the interrupt signal, the keyboard processor may transition from the halt mode to the normal mode, decode and send the keystroke to a host computer, and then transition from the normal mode to the halt mode.

A typical processor has a RESET terminal to receive the externally generated RESET signal mentioned above. A computer system including the processor typically asserts the RESET signal to put the processor in a known state (i.e., a reset state). For example, the computer system may assert the RESET signal when the processor is in an unknown state (e.g., when electrical power is first applied) or when the processor is in an undesired state (e.g., when the processor is operating in the idle or halt mode with interrupts disabled). In response to the RESET signal, the processor typically loads predetermined values into specific registers. This action may, for example, cause the processor to subsequently fetch and execute instructions of system initialization code stored in read only memory (e.g., a bootstrap program).

As used herein, the term "interrupt signal" refers to a control signal which indicates a high-priority request for service. For example, a peripheral device connected to a processor may assert an interrupt signal when ready to transmit data to the processor, or to receive data from the processor. It is noted that an interrupt signal generated external to a processor may not be synchronized with a clock signal of the processor.

The two general categories of types of interrupt signals are "non-maskable" and "maskable." The typical processor described above also has a non-maskable interrupt (NMI) terminal for receiving an NMI signal, and a maskable interrupt (IRQ) terminal for receiving an IRQ signal. The NMI signal is typically asserted when a catastrophic event has occurred or is about to occur. Examples of non-maskable interrupts include bus parity error, failure of a critical hardware component such as a timer, and imminent loss of electrical power.

In general, maskable interrupts are lower-priority requests for service that need not be tended to immediately. Maskable interrupts may be ignored by the processor under program control. A request for service from a peripheral device which is ready to transmit data to a processor, or receive data from the processor, is an example of a maskable interrupt. An interrupt controller (e.g., a programmable interrupt controller or PIC) connected to the processor typically receives maskable interrupt requests from devices connected to the processor, prioritizes the interrupt requests.

When a processor receives an interrupt, application program execution stops, the contents of certain critical registers are saved (i.e., the internal state of the processor is saved), and internal control is transferred to an interrupt service routine (i.e., an interrupt handler) which corresponds to the type of interrupt received. In the case of a maskable or non-maskable interrupt, the interrupt controller typically identifies the interrupt to be serviced.

In a vectored interrupt system, the interrupt controller typically provides a number or instruction address assigned to the interrupt to an instruction sequencing module of the processor (e.g., during an interrupt acknowledge operation).

A non-maskable interrupt is typically assigned a specific interrupt number. The processor uses the interrupt number as an index into the interrupt vector table to obtain the address of the appropriate interrupt service routine. When the interrupt service routine is completed, the saved contents of the critical registers are restored (i.e., the state of the processor is restored), and the processor resumes application program execution at the point where execution was interrupted.

Many modeen processors employ a technique called pipelining to execute more software program instructions (instructions) per unit of time. In general, processor execution of an instruction involves fetching the instruction (e.g., from a memory system), decoding the instruction, obtaining needed operands, using the operands to perform an operation specified by the instruction, and saving a result. In a pipelined processor, the various steps of instruction execution are performed by independent units called pipeline stages. In the pipeline stages, corresponding steps of instruction execution are performed on different instructions independently, and intermediate results are passed to successive stages. By permitting the processor to overlap the executions of multiple instructions, pipelining allows the processor to execute more instructions per unit of time.

In general, a "scalar" processor issues instructions for execution one at a time, and a "superscalar" processor is capable of issuing multiple instructions for execution at the same time. A pipelined scalar processor concurrently executes multiple instructions in different pipeline stages; the executions of the multiple instructions are overlapped as described above. A pipelined superscalar processor, on the other hand, concurrently executes multiple instructions in different pipeline stages, and is also capable of concurrently executing multiple instructions in the same pipeline stage.

SUMMARY OF THE INVENTION

A processor is disclosed including a register, one or more functional units, and a control unit. The register stores multiple bits, wherein one or more of the bits has a value representing a current electrical power dissipation mode of the processor. The one or more functional units receive a power mode signal, and respond to the power mode signal by altering their electrical power dissipation and issuing an acknowledge signal.

The control unit receives a power mode input representing a request to enter a new electrical power dissipation mode, and issues the power mode signal in response to the power mode input. The control unit waits for the acknowledge signal(s), and responds to the acknowledge signal(s) by modifying the one or more bits of the register to reflect the new electrical power dissipation mode.

A method is described for transitioning from a current electrical power dissipation mode to a new electrical power dissipation mode. The method includes providing an ordered set of registers each configured to store a value specifying an electrical power dissipation mode in a corresponding one of multiple sequential stages of a hardware pipeline. A power mode input is received representing a request to transitioning to the new electrical power dissipation mode. A power mode signal is issued to a functional unit in response to the power mode input. The method involves waiting for an acknowledge signal from the functional unit, and responding to the acknowledge signal by modifying the value stored in a first of the ordered set of registers to reflect the new electrical power dissipation mode.

A data processing system is disclosed including a peripheral device coupled to the above described processor.

BRIEF DESCRIPTION OF THE DRAWINGS

The invention may be understood by reference to the following description taken in conjunction with the accompanying drawings, in which like reference numerals identify similar elements, and in which.

DETAILED DESCRIPTION OF THE PREFERRED EMBODIMENTS

In the following disclosure, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art. It is further noted that all functions described herein may be performed in either hardware or software, or a combination thereof, unless indicated otherwise. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections.

Figure 1:
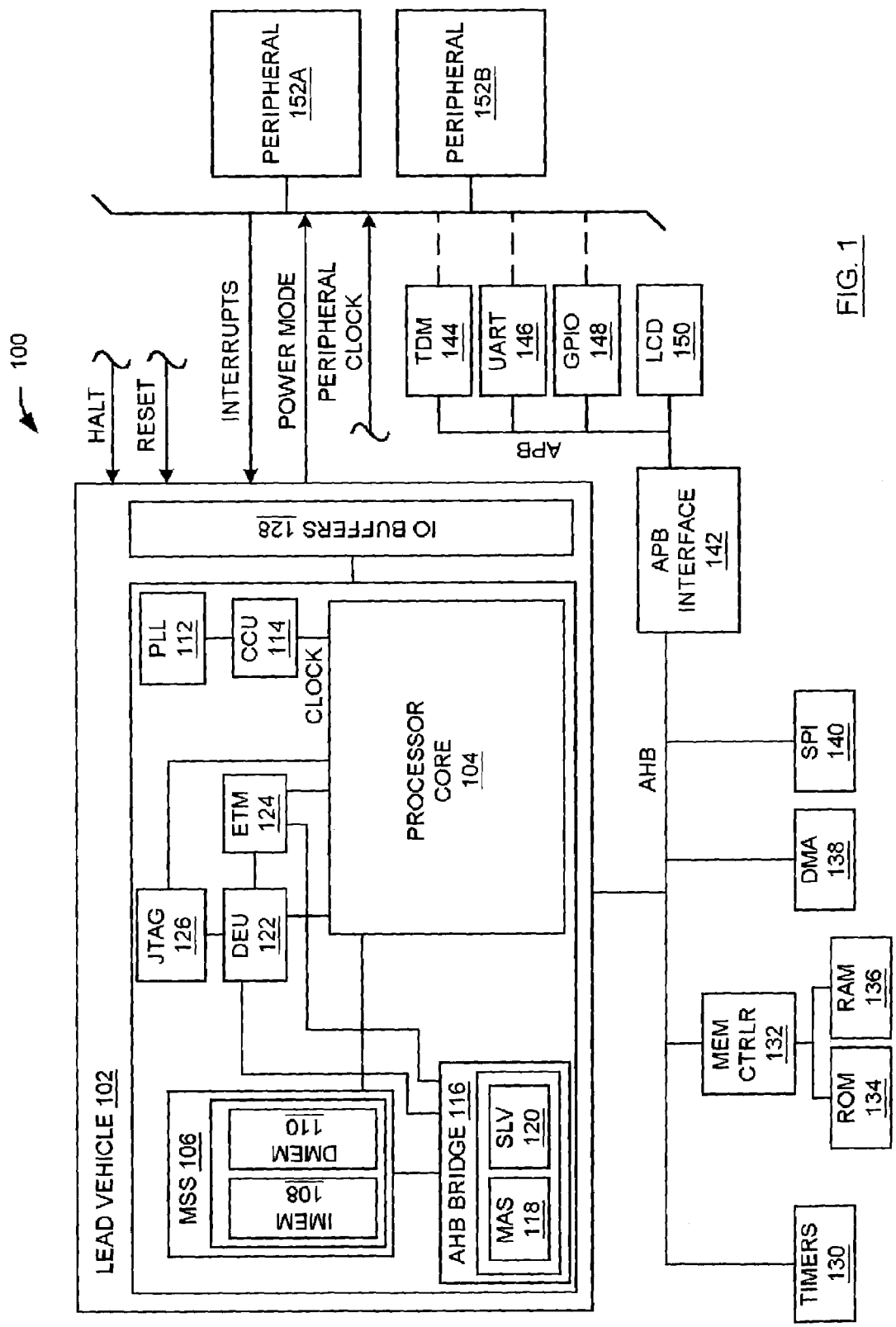
FIG. 1 is a diagram of one embodiment of a data processing system including a lead vehicle coupled to two peripheral devices, wherein the lead vehicle includes a processor core.

FIG. 1 is a diagram of one embodiment of a data processing system 100 including a lead vehicle 102 coupled to two peripheral devices (i.e., peripherals) 152A and 152B. The lead vehicle 102 includes a processor core 104 coupled to a memory subsystem (MSS) 106. In the embodiment of FIG. 1, the memory subsystem (MSS) 106 includes an instruction memory (IMEM) 108 for storing instructions and a data memory (DMEM) 110 for storing data.

The processor core 104 is both a "processor" and a "core." The term "core" describes the fact that the processor core 104 is a functional block or unit of the lead vehicle 102. It is now possible for integrated circuit designers to take highly complex functional units or blocks, such as processors, and integrate them into an integrated circuit much like other less complex building blocks.

In general, the processor core 104 executes instructions of a predefined instruction set stored in the memory subsystem (MSS) 106. As indicated in FIG. 1, the processor core 104 receives a clock signal "CLOCK" and executes instructions dependent upon the CLOCK signal. Mores specifically, the processor core 104 includes several functional units, and operations performed within many of the functional units are synchronized by the CLOCK signal.

As will be described in detail below, the processor core 104 (and more generally, the lead vehicle 102) is configured to operate in several different electrical power dissipation modes (i.e., power modes), and a "POWER MODE" signal conveying a current power mode of the processor core 104 is provided to the peripherals 152A and 152B. The peripherals 152A and 152B may be configured to respond to the POWER MODE signal (e.g., to enter a power mode similar to the current power mode of the processor core 104).

In the embodiment of FIG. 1, the lead vehicle 102 also includes a phase-locked loop (PLL) unit 112 coupled to a clock control unit (CCU) 114. In general, the PLL unit 112 generates a clock signal dependent upon external signals and under the control of the clock control unit (CCU) 114, and provides the clock signal to the clock control unit (CCU) 114. The clock control unit (CCU) 114 receives the clock signal generated by the PLL 112 and the POWER MODE signal produced by the processor core 104, and uses the clock signal generated by the PLL 112 to generate clock signals for the various components of the lead vehicle 102 dependent upon the POWER MODE signal.

For example, the clock control unit (CCU) 114 produces both the CLOCK signal received by the processor core 104 and an "INTERRUPT CLOCK" signal provided to an interrupt control unit of the processor core 104. In some power modes of the processor core 104 described below, the CLOCK signal is inactive (i.e., not running) while the INTERRUPT CLOCK signal is active (i.e., running).

In the embodiment of FIG. 1, the lead vehicle 102 also includes an advanced microcontroller bus architecture (AMBA) advanced high performance bus (AHB) bridge 116. A typical AMBA AHB system consists of one or more master devices, one or more slave devices, an arbiter, and a decoder. The arbiter grants control of the bus to one of the master devices. The decoder decodes an address driven on the bus and provides a select signal to the slave associated with the address signal.

In the embodiment of FIG. 1, the AHB bridge 116 includes a master (MAS) portion 118 and a slave (SLV) portion 120. The master (MAS) portion 118 allows master devices within the lead vehicle 102 access a table or "mapping" of a memory space external to the lead vehicle 102. For example, the memory subsystem (MSS) 106 routes accesses to the external memory space to the AHB bridge 116. The slave (SLV) portion 120 allows master devices external to the lead vehicle 102 to access memory within the lead vehicle 102 (e.g., the IMEM 108 and the DMEM 110 of the memory subsystem MSS 106).

In the embodiment of FIG. 1, the lead vehicle 102 also includes a device emulation unit (DEU) 122, an embedded trace module (ETM) 124, and a Joint Test Action Group (JTAG) unit 126. The DEU 122 contains hardware that allows users to set load/store data value breakpoints, instruction address breakpoints, read and write to system memory, and control instruction execution profiling functions. The DEU 122 interprets debug commands destined for the processor core 104.

The ETM 124 allows capturing of execution history and/or real time information from the processor core 104. The ETM 124 either stores the data in local memory or streams it out of the lead vehicle 102 in real time to external storage. In general, the JTAG unit 126 includes an IEEE Standard 1149.1 compatible boundary scan access port for circuit-level testing of the processor core 104. Read and write requests from an external source (e.g., a host processor coupled to the lead vehicle 102) directed to registers of the DEU 122 are routed through the JTAG unit 126.

In the embodiment of FIG. 1, the lead vehicle 102 also includes input/output (IO) buffers. All signals entering and exiting the lead vehicle 102 pass through, and are buffered by, the IO buffers 128.

In the embodiment of FIG. 1, the data processing system 100 includes timers 130, a memory controller 132, a direct memory access (DMA) unit 138, a service provider interface (SPI) 140, and an advanced peripheral bus (APB) interface 142 coupled to the lead vehicle 102 via the AHB bridge 116 and an advanced microcontroller bus architecture (AMBA) advanced high performance bus (AHB) bus. The timers 130 are external timers for carrying out timing functions. The memory controller 132 is coupled to a read only memory (ROM) 134 and a random access memory (RAM) 136, and controls operations of the ROM 134 and the RAM 136. The DMA unit 138 allows access to the memory subsystem (MSS) 106 of the lead vehicle 102 substantially independent of the processor core 104.

The SPI 140 is a telephony interface allowing access to a telephone system (e.g., the public switched telephone network). The APB interface 142 is coupled between the AMBA AHB bus and an advanced peripheral bus (APB), and converts bus signals between the AMBA AHB bus and the APB.

In the embodiment of FIG. 1, the data processing system 100 includes a time division multiplexing (TDM) unit 144, a universal asynchronous receiver transmitter (UART) 146, a general purpose input/output (GPIO) interface 148, and a liquid crystal display (LCD) unit 150, all coupled to the advanced peripheral bus (APB). The TDM unit 144 provides one or more high speed serial ports supporting multi-bit transfers, and implement a TDM mode compatible with T1/E1 framers. The UART 146 allows asynchronous data transfers with serial communication devices. The UART 146 may provide, for example, a data terminal equipment (DTE) interface according to the RS-232C serial communication standard.

The GPIO interface 148 includes programmable input/output (I/O) terminals providing a configurable electrical interface (e.g., for connection to an communication with one or more external devices). The LCD unit 150 includes a liquid crystal visual display device.

As indicated in FIG. 1, the peripherals 152A and 152B may be coupled to the TDM unit 144, the UART 146, or the GPIO interface 148. For example, the peripheral 152A may be a device configured to receive serial data from, and/or transmit serial data to, the lead vehicle 102 via the TDM unit 144 or the UART 146. The peripheral 152B may be a device configured to receive serial or parallel data from, and/or transmit serial or parallel data to, the lead vehicle 102 via the GPIO interface 148.

As indicated in FIG. 1, the peripherals 152A and 152B generate and provide interrupt signals "INTERRUPTS" to the lead vehicle 102. The interrupt signals INTERRUPTS include a non-maskable interrupt (NMI) signal and multiple maskable (e.g., "IRQ") interrupt signals. As described in detail below, the processor core 104 of the lead vehicle 102 receives and responds to the INTERRUPTS signals.

As indicated in FIG. 1, lead vehicle 102 also receives a "HALT" signal and a "RESET" signal. In general, the HALT signal represents a request to enter a halt power mode described below. For example, an external host processor coupled to the lead vehicle 102 may execute debugging software (i.e., may be running a debugger). During the debugging operation, the host processor may issue the HALT signal to stop the operations of the processor core 104. Then, using a test clock signal, the host processor may obtain information from the processor core 104 (i.e., scan out information stored within the processor core 104). Alternately, the processor core 104 may be one of several processors of a system, and it may be desirable to issue the HALT signal to stop the operations of the processor core 104. As is typical, the RESET signal is used to place the processor 104 in a known state (e.g., a reset state). As described in detail below, the processor core 104 of the lead vehicle 102 receives and responds to the HALT signal and the RESET signal.

As indicated in FIG. 1 and described above, the peripherals 152A and 152B receive the POWER MODE signal from the processor core 104 conveying a current power mode of the processor core 104. The peripherals 152A and 152B may be configured to respond to the signals (e.g., to enter a power mode similar to the current power mode of the processor core 104).

As indicated in FIG. 1, the peripherals 152A and 152B receive a "PERIPHERAL CLOCK" signal, and operate dependent upon the PERIPHERAL CLOCK signal. The clock control unit (CCU) 114 may, for example, generate the PERIPHERAL CLOCK signal.

In the embodiment of FIG. 1, the processor core 104 implements a load-store architecture. That is, the instruction set includes load instructions used to transfer data from the memory subsystem (MSS) 106 to registers of the processor core 104, and store instructions used to transfer data from the registers of the processor core 104 to the memory subsystem (MSS) 106. Instructions other than the load and store instructions specify register operands, and register-to-register operations. In this manner, the register-to-register operations are decoupled from accesses to the memory subsystem (MSS) 106.

Figure 2:
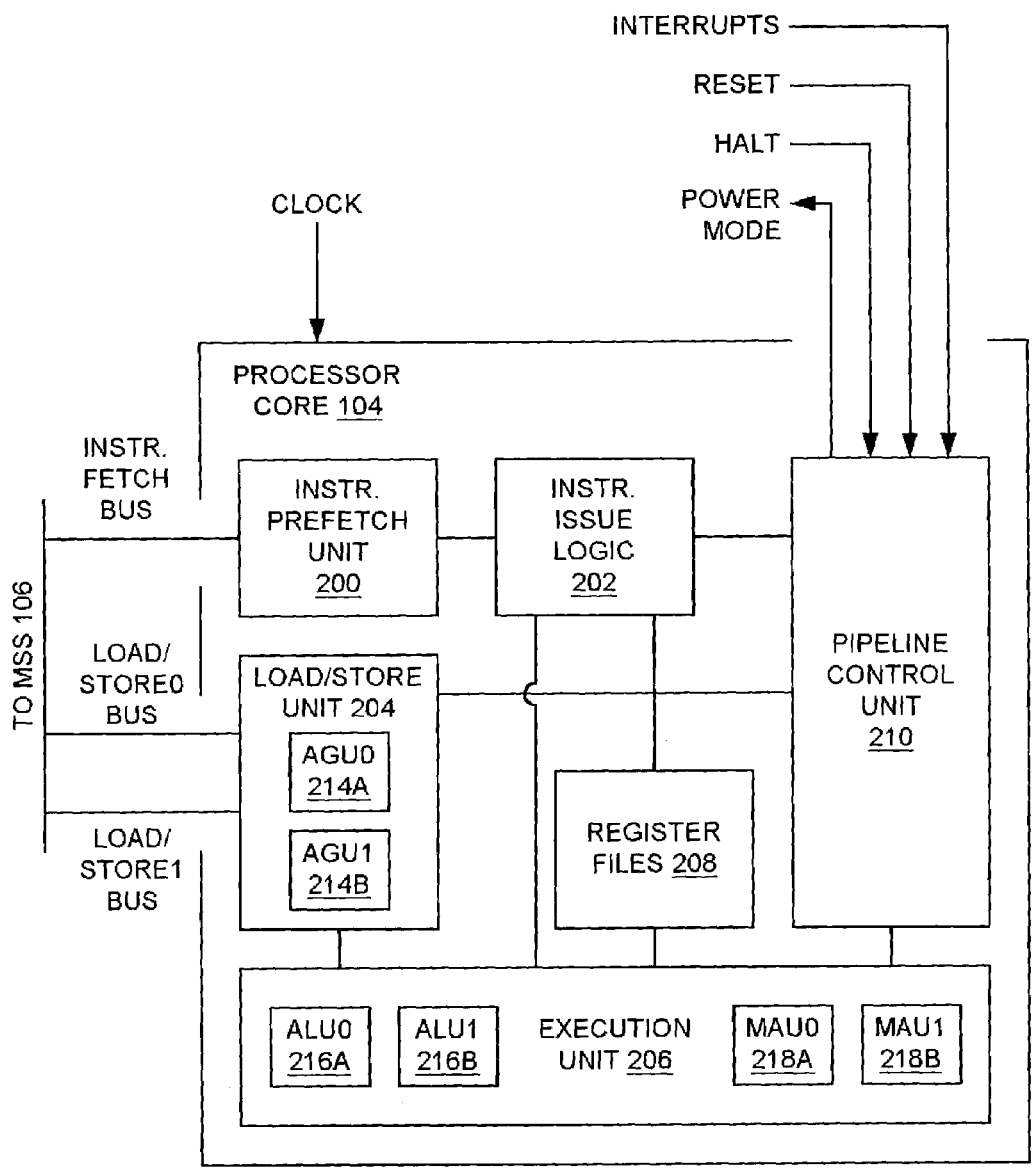
FIG. 2 is a diagram of one embodiment of the processor core of FIG. 1, wherein the processor core includes a pipeline control unit implementing an instruction execution pipeline.

FIG. 2 is a diagram of one embodiment of the processor core 104 of FIG. 1. In the embodiment of FIG. 2, the processor core 104 includes an instruction prefetch unit 200, instruction issue logic 202, a load/store unit (LSU) 204, an execution unit 206, register files 208, and a pipeline control unit 210. The instruction prefetch unit 200, the instruction issue logic 202, the load/store unit (LSU) 204, the execution unit 206, the register files 208, and the pipeline control unit 210 may be considered functional units of the processor core 104, and may contain other functional units.

In the embodiment of FIG. 2, the processor core 104 is a pipelined superscalar processor core. That is, the processor core 104 implements an instruction execution pipeline including multiple pipeline stages, concurrently executes multiple instructions in different pipeline stages, and is also capable of concurrently executing multiple instructions in the same pipeline stage.

In general, the instruction prefetch unit 200 fetches instructions from the memory subsystem (MSS) 106 of FIG. 1, and provides the fetched instructions to the instruction issue logic 202. In one embodiment, the instruction prefetch unit 200 is capable of fetching up to 8 instructions at a time from the memory subsystem (MSS) 106, partially decodes and aligns the instructions, and stores the partially decoded and aligned instructions in an instruction cache within the instruction prefetch unit 200.

The instruction issue logic 202 receives (or retrieves) partially decoded instructions from the instruction cache of the instruction prefetch unit 200, fully decodes the instructions, and stores the fully decoded instructions in an instruction queue. In one embodiment, the instruction issue logic 202 is capable of receiving (or retrieving) n partially decoded instructions (n>1) from the instruction cache of the instruction prefetch unit 200, and decoding the n partially decoded instructions, during a single cycle of the CLOCK signal. In one embodiment, the instruction issue logic 202 translates instruction operation codes (i.e., opcodes) into native opcodes for the processor. The instruction issue logic 202 checks the multiple decoded instructions using grouping and dependency rules, and provides (i.e., issues) one or more of the decoded instructions conforming to the grouping and dependency rules as a group to the execution unit 206 for simultaneous execution.

The LSU 204 is used to transfer data between the processor core 104 and the memory subsystem (MSS) 106 as described above. In the embodiment of FIG. 2, the LSU 204 includes 2 independent load/store units: a load/store unit 0 (LSU0) and a load/store unit 1 (LSU1). Each of the 2 independent load/store units accesses the memory subsystem (MSS) 106 via separate load/store buses. LSU0 is coupled to the memory subsystem (MSS) 106 via a load/store0 bus shown in FIG. 2, and LSU1 is coupled to the memory subsystem (MSS) 106 via a load/store1 bus. In addition, each of the 2 independent load/store units includes a separate address generation unit (AGU) for generating and translating address signals needed to access values stored in the memory subsystem (MSS) 106. LSU0 includes an address generation unit 0 (AGU0) labeled 214A in FIG. 2, and LSU1 includes an address generation unit 1 (AGU1) labeled 214 B.

The execution unit 206 is used to perform operations specified by instructions (and corresponding decoded instructions). In the embodiment of FIG. 2, the execution unit 206 includes 2 independent arithmetic logic units (ALUs): an arithmetic logic unit 0 (ALU0) labeled 216A in FIG. 2, and an arithmetic logic unit 1 (ALU1) labeled 216B. The execution unit 206 also includes 2 independent multiply/accumulate units (MAUs): a multiply/accumulate unit 0 (MAU0) labeled 218A in FIG. 2, and an multiply/accumulate unit 1 (MAU1) labeled 218B.

The instruction issue logic 202 issues one or more decoded instructions as a group to the AGU0 214A, the AGU1 214B, the ALU0 216A, the ALU1 216B, the MAU0 218A, and/or the MAU1 218B. In general, the AGU0 214A, the AGU1 214B, the ALU0 216A, the ALU1 216B, the MAU0 218A, and the MAU1 218B receive operands from the instruction issue logic 202 (e.g., immediate operands), the register files 208 (e.g., register operands), and the LSU 204 (e.g., memory operands), and/or forwarded results previously produced by other units of that group.

In general, the register files 208 include one or more register files of the processor core 104 (e.g., an address register file, a data or operand register file, and/or a control register file). The register files may, for example, be accessed in response to read/write enable signals from the pipeline control unit 210.

In general, the pipeline control unit 210 controls an instruction execution pipeline implemented within the processor core 104 and described in more detail below. As indicated in FIG. 2, the pipeline control unit 210 also receives the interrupt signals INTERRUPTS from the peripherals 152A and 152B of FIG. 1, the HALT signal, and the RESET signal. The pipeline control unit 210 responds to the interrupt signals, the HALT signal, and the RESET signal as described in more detail below, and produces the POWER MODE signal as indicated in FIG. 2.

Figure 3:
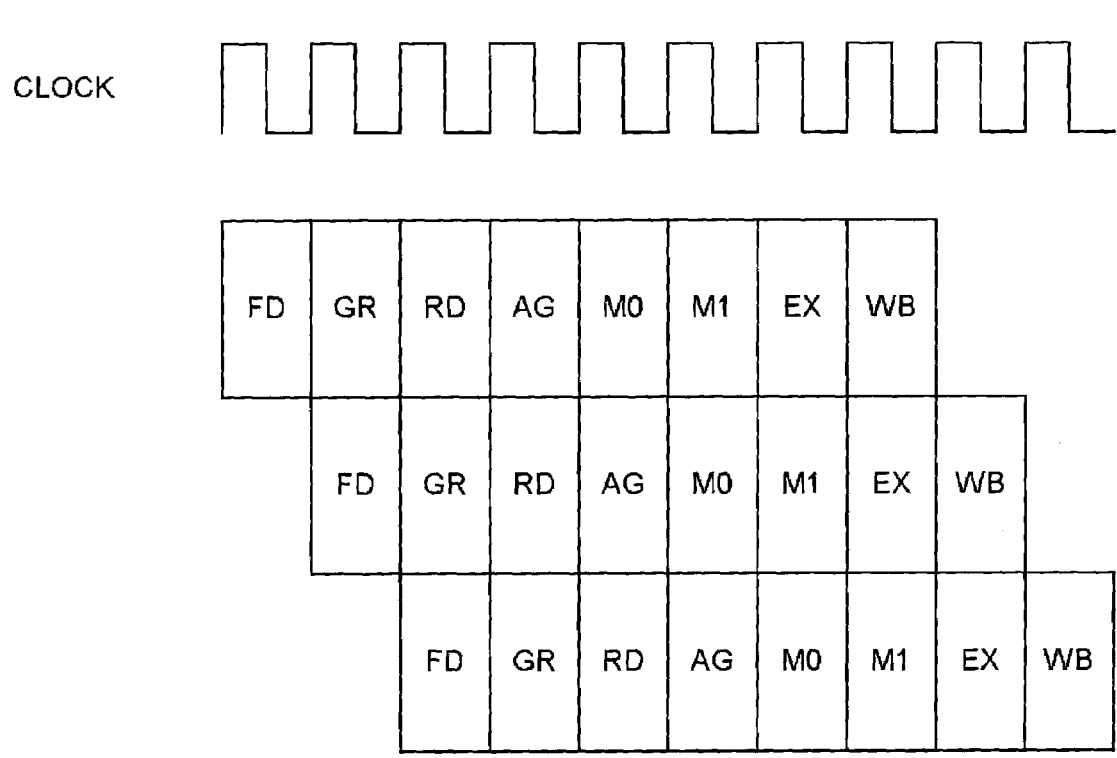
FIG. 3 is a diagram illustrating one embodiment of the instruction execution pipeline implemented within the processor core of FIG. 2.

FIG. 3 is a diagram illustrating one embodiment of the instruction execution pipeline implemented within the processor core 104 of FIG. 2 and controlled by the pipeline control unit 210 of FIG. 2. The instruction execution pipeline (pipeline) allows overlapped execution of multiple instructions. In the embodiment of FIG. 3, the pipeline includes 8 stages: a fetch/decode (FD) stage, a grouping (GR) stage, an operand read (RD) stage, an address generation (AG) stage, a memory access 0 (M0) stage, a memory access 1 (M1) stage, an execution (EX) stage, and a write back (WB) stage. As indicated in FIG. 3, operations in each of the 8 pipeline stages are completed during a single cycle of the CLOCK signal.

Referring to FIGS. 1, 2, and 3, the instruction fetch unit 200 fetches several instructions (e.g., up to 8 instructions) from the memory subsystem (MSS) 106 during the fetch/decode (FD) pipeline stage, partially decodes and aligns the instructions, and provides the partially decoded instructions to the instruction issue logic 202. The instruction issue logic 202 fully decodes the instructions and stores the fully decoded instructions in an instruction queue (described more fully later). The instruction issue logic 202 also translates the opcodes into native opcodes for the processor.

During the grouping (GR) stage, the instruction issue logic 202 checks the multiple decoded instructions using grouping and dependency rules, and passes one or more of the decoded instructions conforming to the grouping and dependency rules on to the read operand (RD) stage as a group. During the read operand (RD) stage, any operand values, and/or values needed for operand address generation, for the group of decoded instructions are obtained from the register files 208.

During the address generation (AG) stage, any values needed for operand address generation are provided to the LSU 204, and the LSU 204 generates internal addresses of any operands located in the memory subsystem (MSS) 106. During the memory address 0 (M0) stage, the LSU 204 translates the internal addresses to external memory addresses used within the memory subsystem (MSS) 106.

During the memory address 1 (M1) stage, the LSU 204 uses the external memory addresses to obtain any operands located in the memory subsystem (MSS) 106. During the execution (EX) stage, the execution unit 206 uses the operands to perform operations specified by the one or more instructions of the group. During a final portion of the execution (EX) stage, valid results (including qualified results of any conditionally executed instructions) are stored in registers of the register files 208.

During the write back (WB) stage, valid results (including qualified results of any conditionally executed instructions) of store instructions, used to store data in the memory subsystem (MSS) 106 as described above, are provided to the LSU 204. Such store instructions are typically used to copy values stored in registers of the register files 208 to memory locations of the memory subsystem (MSS) 106.

Figure 4:
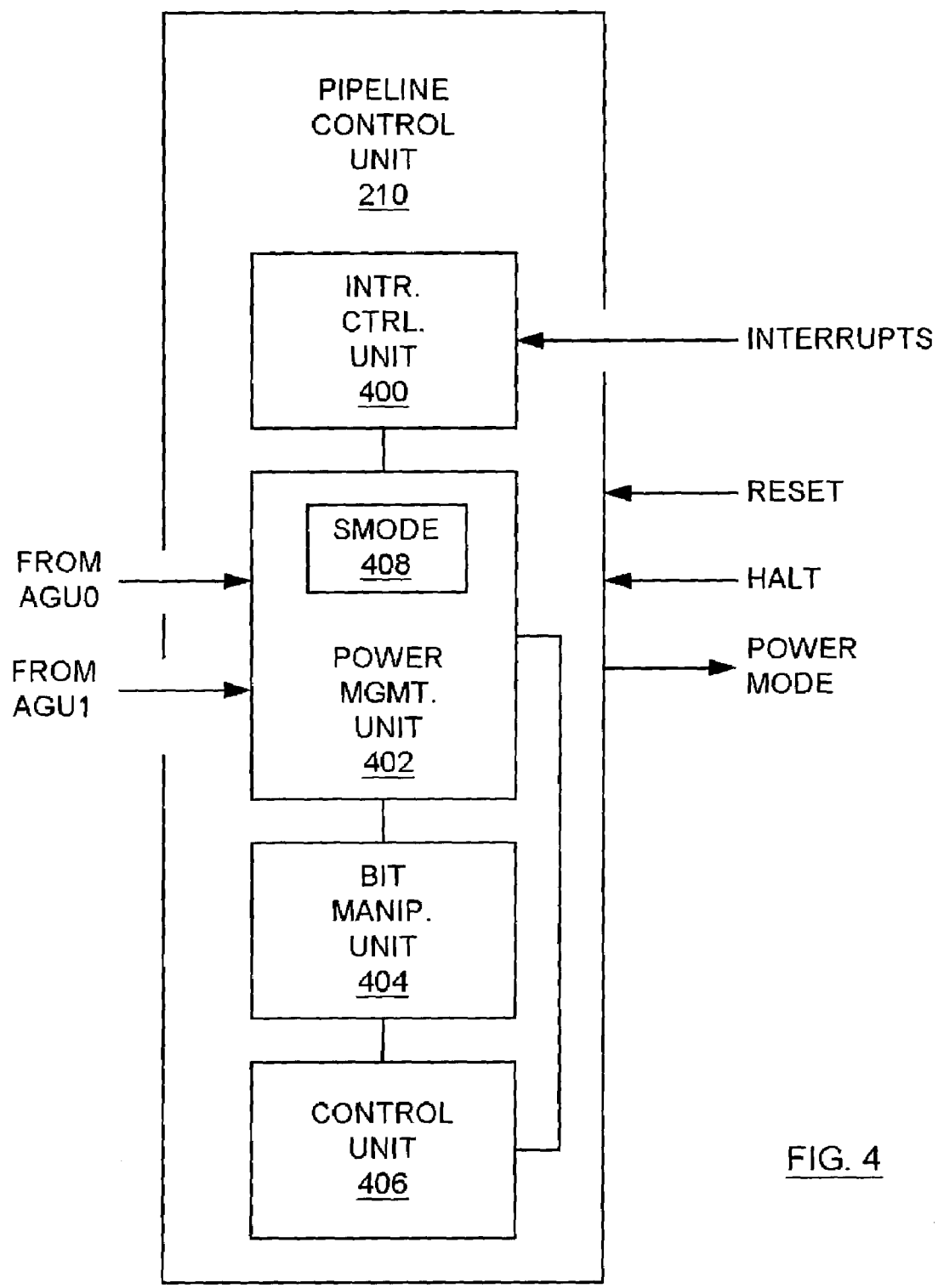
FIG. 4 is a diagram of one embodiment of the pipeline control unit of FIG. 2, wherein the pipeline control unit includes a power management unit having a system mode (SMODE) register.

FIG. 4 is a diagram of one embodiment of the pipeline control unit 210 of FIG. 2. In the embodiment of FIG. 2, the pipeline control unit 210 includes an interrupt control unit 400, a power management unit 402, a bit manipulation unit 404, a control unit 406. As indicated in FIG. 4, the interrupt control unit 400 receives the interrupt signals INTERRUPTS from the peripherals 152A and 152B of FIG. 1. The pipeline control unit 210 receives the HALT and RESET signals, and produces the POWER MODE signal. The power management unit 402 includes a system mode (SMODE) register 408.

In general, the interrupt control unit 400 implements a vectored priority interrupt system in which higher priority interrupts are handled (i.e., serviced) first. The non-maskable interrupt (NMI) signal has the highest priority of all the interrupt signals. As described below, the interrupt signals INTERRUPTS are used to effect transitions from each of several power mode states of the processor core 104 of FIGS. 1 and 2 (and the lead vehicle 102 of FIG. 1) to a normal mode.

The interrupt signals INTERRUPTS are buffered as they enter lead vehicle 102 by the IO buffers 128 of FIG. 1, and are provided to the interrupt control unit 400. The interrupt control unit 400 includes a 16-bit interrupt request register having bit locations corresponding to 2 non-maskable interrupt signals and 14 maskable interrupt bit locations. The 2 non-maskable interrupt signals include the NMI signal and a device emulation interrupt (DEI) signal. When an interrupt signal is received, the corresponding bit location in the interrupt request register is set to '1'. Each bit location in the interrupt request register is cleared only when the processor core 104 services the corresponding interrupt signal, or explicitly by software. In response to the RESET signal, the value 0x0000 is stored in the interrupt request register (i.e., the interrupt request register is cleared).

In one embodiment, the interrupt control unit 400 also includes an interrupt mask register containing mask bit locations for each of the 14 maskable interrupts. A mask bit value of '0' (i.e., a cleared bit) prevents the corresponding interrupt from being serviced (i.e., masks the corresponding interrupt signal). In response to the RESET signal, the value 0x0000 is stored in the interrupt mask register (i.e., the interrupt mask register is cleared).

In one embodiment, the interrupt control unit 400 also includes two 16-bit interrupt priority registers. Consecutive bit locations in each of the interrupt priority registers are used to store user-defined priority levels associated with the 14 maskable interrupt signals. Software programs may write to the bit locations of the interrupt priority registers. User-defined interrupt priorities may range from 0b00 (i.e., decimal '0') to 0b11 (i.e., decimal '3'), with 0b00 being the lowest and 0b11 being the highest. (The NMI signal has a fixed priority level of decimal '5', and the DEI signal has a fixed priority level of decimal '4'.) In response to the RESET signal, the value 0x0000 is stored in each of the interrupt priority registers (i.e., the interrupt priority registers are cleared).

For maskable interrupts, the interrupt control unit 400 uses the mask bits in the interrupt mask register and the priority levels in the interrupt priority registers to determine the highest unmasked priority interrupt to be service next. If a maskable interrupt request occurs while an interrupt service routine is executing, the interrupt request is considered a pending interrupt.

If either the NMI signal or the DEI signal is received while any maskable interrupt is being serviced, the interrupt control unit 400 saves the existing interrupt state and initiates the NMI or DEI interrupt service routine. If the NMI signal is received while the DEI signal is being serviced, the interrupt control unit 400 saves the existing interrupt state and initiates the NMI interrupt service routine.

If, while executing a DEI or NMI interrupt service routine, the same interrupt occurs again, the interrupt control unit 400 starts the interrupt service routine again without saving or changing the interrupt state.

Once the interrupt control unit 400 decides to service an interrupt, the interrupt control unit 400 signals the instruction issue logic 202 of FIG. 2 to stop grouping instructions in the grouping (GR) stage of the execution pipeline. Instructions fetched and partially decoded up to and including those in the grouping (GR) stage are flushed. Executions of instructions in the operand read (RD) stage, the address generation (AG) stage, the memory access 0 (M0) stage, the memory access 1 (M1) stage, and the execution (EX) stage are completed normally before instructions of the service routine are fetched and executed.

In general, the processor core 104 of FIGS. 1 and 2 (and more generally the lead vehicle 102 of FIG. 1) is capable of operating in any one of several operating modes, and the contents of the system mode register 408 determines a current operating mode of the processor core 104 (and the lead vehicle 102). One embodiment of the system mode register 408 is described below.

Figure 5:
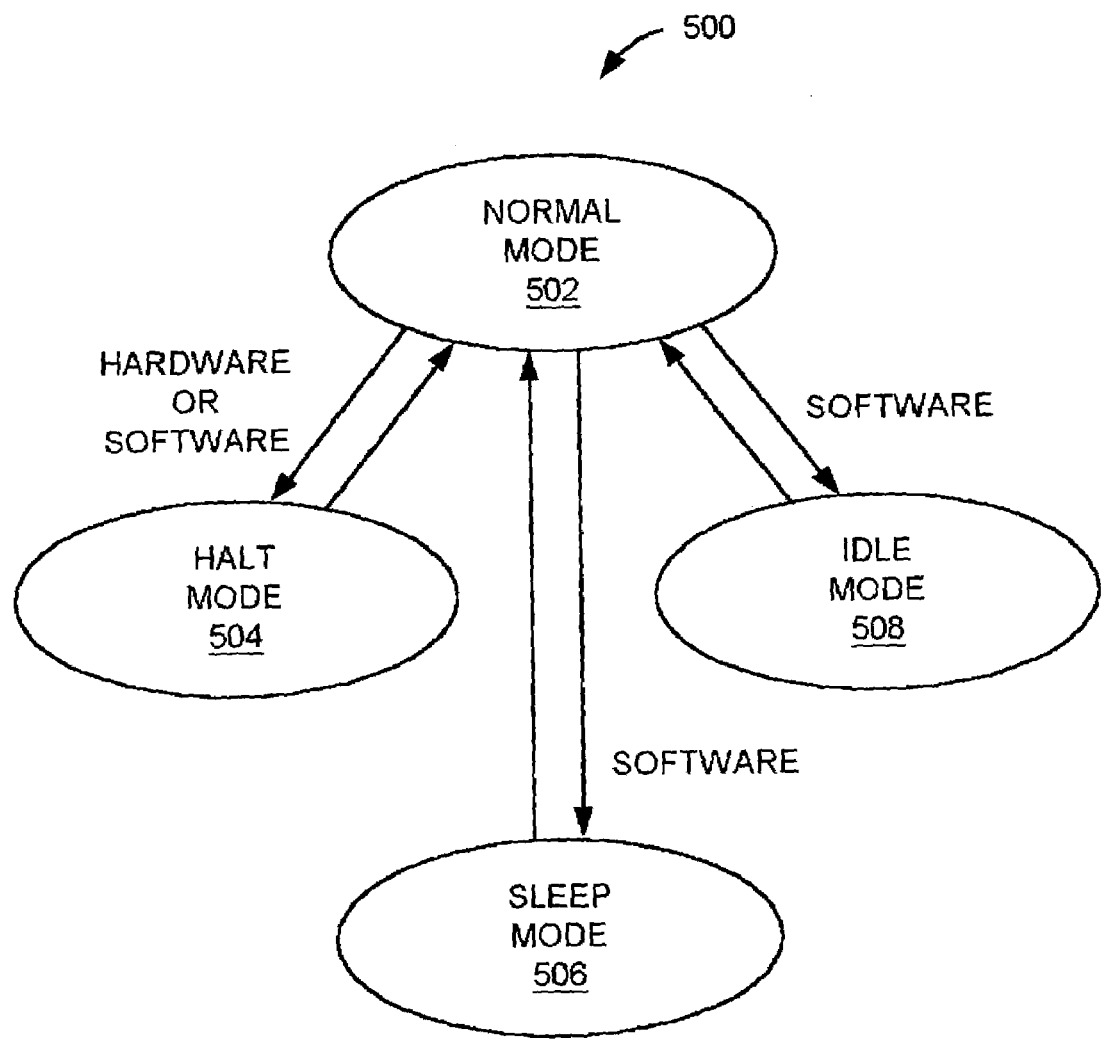
FIG. 5 is a diagram depicting electrical power dissipation modes (i.e., power modes) of the processor core of FIGS. 1 and 2 (and more generally the lead vehicle of FIG. 1) implemented by the power management unit of FIG. 4, including a normal mode, a halt mode, a sleep mode, and an idle mode.

FIG. 5 is a diagram depicting power modes of the processor core 104 of FIGS. 1 and 2 (and more generally the lead vehicle 102 of FIG. 1) implemented by the power management unit 402 of FIG. 4, including a normal mode 502, a halt mode 504, a sleep mode 506, and an idle mode 508.

In the normal mode 502, the CPU_CLOCK signal is operating normally (i.e., "running"), and all of the functional units of the processor core 104 of FIGS. 1 and 2 are active and operating, including the instruction prefetch unit 200, the instruction issue logic 202, and the load/store unit 204 of FIG. 2. The PERIPHERAL CLOCK signal provided to the peripherals 152A and 152B of FIG. 1 is running, and the peripherals 152A and 152B are active and operating. The INTERRUPT CLOCK signal is running, and the interrupt control unit 400 of FIG. 4 is active and operating.

In the halt mode 504, the CPU_CLOCK signal is stopped, and all of the functional units of the processor core 104 of FIGS. 1 and 2 are inactive and not operating, including the instruction prefetch unit 200, the instruction issue logic 202, and the load/store unit 204 of FIG. 2. The PERIPHERAL CLOCK signal is also stopped, and the peripherals 152A and 152B of FIG. 1 are inactive and not operating. The INTERRUPT CLOCK signal is running, and the interrupt control unit 400 of FIG. 4 is active and operating. Only the NMI or RESET signal causes a transition from the halt mode 504 to the normal mode 502 (i.e., wakes up the processor core 104).

In the sleep mode 506, the CPU_CLOCK signal is stopped, and all of the functional units of the processor core 104 of FIGS. 1 and 2 are inactive and not operating, including the instruction prefetch unit 200, the instruction issue logic 202, and the load/store unit 204 of FIG. 2. The PERIPHERAL CLOCK signal is also stopped, and the peripherals 152A and 152B of FIG. 1 are inactive and not operating. The INTERRUPT CLOCK signal is running, and the interrupt control unit 400 of FIG. 4 is active and operating. In one embodiment, the NMI signal or any one of a subset of the maskable interrupt signals or the RESET signal causes a transition from the sleep mode 506 to the normal mode 502 (i.e., wakes up the processor core 104).

In the idle mode 508, the CPU_CLOCK signal is stopped, and all of the functional units of the processor core 104 of FIGS. 1 and 2 are inactive and not operating, including the instruction prefetch unit 200, the instruction issue logic 202, and the load/store unit 204 of FIG. 2. The PERIPHERAL CLOCK signal is running, and the peripherals 152A and 152B of FIG. 1 are active and operating. The INTERRUPT CLOCK signal is running, and the interrupt control unit 400 of FIG. 4 is active and operating. In one embodiment, any interrupt signal or the RESET signal cause a transition from the idle mode 508 to the normal mode 502 (i.e., wakes up the processor core 104).

As indicated in FIG. 5 and described in more detail below, the processor core 104 can transition from the normal mode 502 to the halt mode 504 in response to hardware or software inputs, while transitions from the normal mode 502 to the sleep mode 506 and the idle mode 508 are made only in response to software inputs.

Figure 6A:
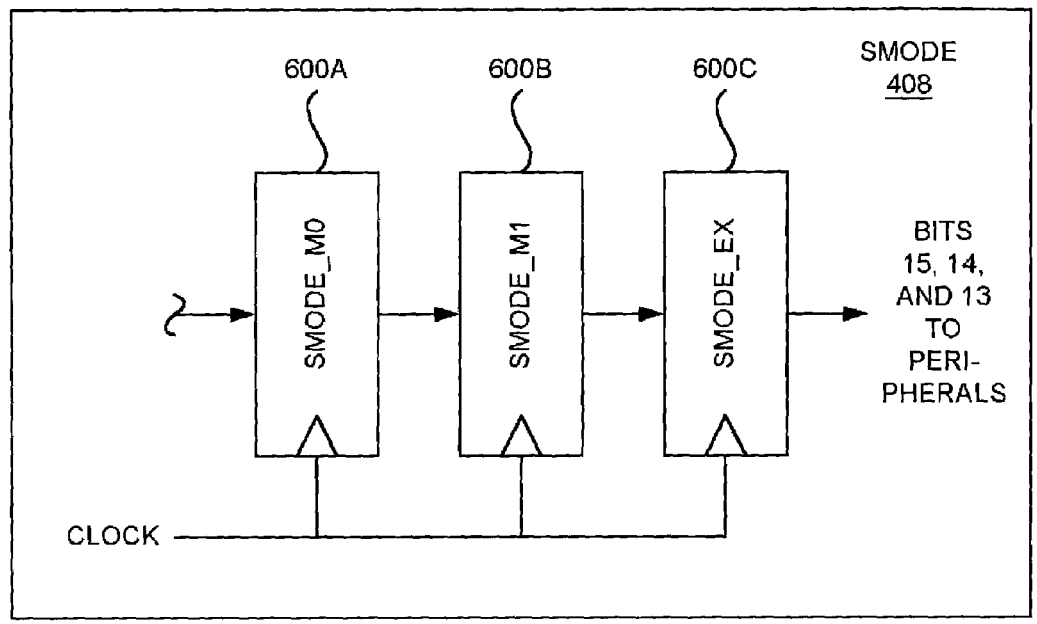
FIG. 6A is a diagram of one embodiment of the system mode (SMODE) register of FIG. 4, wherein the system mode (SMODE) register includes multiple registers connected in series.

FIG. 6A is a diagram of one embodiment of the system mode (SMODE) register 408 of FIG. 4. In the embodiment of FIG. 6A, the SMODE register 408 includes an SMODE_M0 register 600A, an SMODE_M1 register 600B, and an SMODE_EX register 600C. In the embodiment of FIG. 6A, the SMODE_M0 register 600A is associated with the above described memory address 0 (M0) stage of the execution pipeline, the SMODE_M1 register 600A is associated with the memory address 1 (M1) stage of the pipeline, and the SMODE_EX register 600A is associated with the execution (EX) stage of the pipeline. Herein below, the SMODE_M0 register 600A, the SMODE_M1 register 600B, and the SMODE_EX register 600C are referred to collectively as the registers 600 of the system mode (SMODE) register 408.

As indicated in FIG. 6A, the registers 600 of the system mode (SMODE) register 408 are coupled in series according to the sequence of pipeline stages such that during a transition from one pipeline stage to another, the contents of one of the registers 600 corresponding to the one pipeline stage is transferred to another one of the registers 600 corresponding to the subsequent pipeline stage.

Figure 6B:
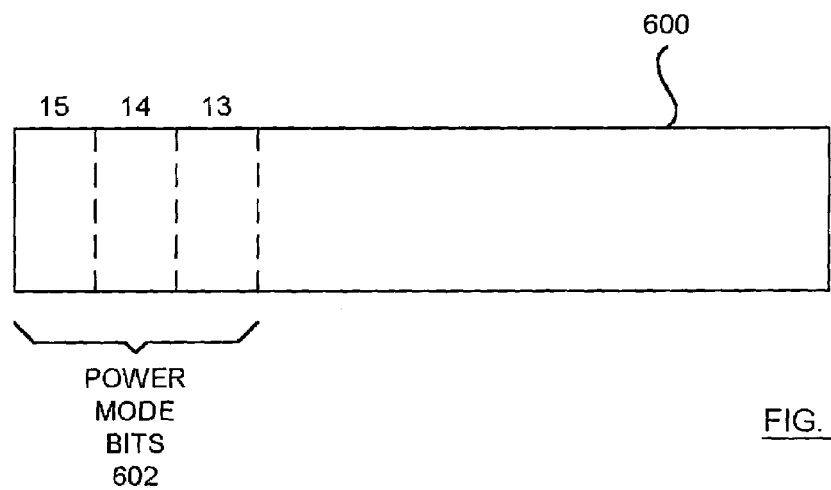
FIG. 6B is a diagram of one embodiment of each of the registers of the system mode (SMODE) register of FIG. 6A.

FIG. 6B is a diagram of one embodiment of each of the registers 600 of FIG. 6A. In the embodiment of FIG. 6B, each of the registers 600 is a 16-bit register and has 3 power mode bits labeled 602: bits 15, 14, and 13. In general, different values of the 3 power mode bits 602 are used to represent the 3 different power modes of the processor core 104: the normal mode 502, the halt mode 504, the sleep mode 506, and the idle mode 508 of FIG. 5.

Table 1 below gives exemplary encodings of the 3 power mode bits 602 of each of the registers 600 to represent the 4 different power modes of the processor core 104. More specifically, in the embodiment of FIG. 6B and using the exemplary encodings of Table 1, a first (bit 15) of the 3 power mode bits 602 represents the halt mode 504, a second (bit 14) represents the sleep mode 506, and the third (bit 13) represents the idle mode 508, and all 3 power mode bits 602 have '0' values in the normal mode 502.

TABLE 1

Exemplary Encodings of the Power Mode Bits 602
To Represent the 3 Different Power Modes.

| Bit | | | |
|---|---|---|---|
| 15 | 14 | 13 | Power Mode |
| 0 | 0 | 0 | Normal Mode |
| 0 | 0 | 1 | Idle Mode |
| 0 | 1 | 0 | Sleep Mode |
| 1 | 0 | 0 | Halt Mode |

In the embodiments of FIGS. 6A and 6B, in response to the RESET signal, a '0' is stored in each of the 3 power mode bits 602 of each of the registers 600 of the system mode (SMODE) register 408.

Transition from Normal Mode to Halt Mode

Referring back to FIGS. 1, 2, 4, 5, 6A, and 6B in combination, in one embodiment of the data processing system 100, when the processor core 104 is operating in the normal mode 502 and the lead vehicle 102 receives the hardware HALT signal, the HALT signal is first stored in a register of the pipeline control unit 210. During the next pipeline transition from the read operand (RD) stage to the address generation (AG) stage, a signal pulse generated within the pipeline control unit 210 causes the stored HALT signal to be transferred to another register, and the power management unit 402 of the pipeline control unit 210 issues a HALT signal to the instruction prefetch unit 200, the instruction issue logic 202, and the load/store unit 204.

The instruction prefetch unit 200 and the load/store unit 204 conduct operations or activities that may need to be completed before a transition from the normal mode 502 to the halt mode 504. Accordingly, the power management unit 402 waits for a HALT ACKNOWLEDGE signal from the instruction prefetch unit 200 and the load/store unit 204 indicating that any such operations in progress have been completed.

For example, the instruction prefetch unit 200 may have instruction fetch transactions in progress with the memory subsystem (MSS) 106 when the HALT signal is received from the power management unit 402. In response to the HALT signal, the instruction prefetch unit 200 completes or aborts any outstanding instruction fetch transactions and stops issuing further transactions before issuing a HALT ACKNOWLEDGE signal to the power management unit 402.

Similarly, the load/store unit 204 may have memory access transactions in progress with the memory subsystem (MSS) 106 when the load/store unit 204 receives the HALT signal from power management unit 402. In response to the HALT signal, the load/store unit 204 completes any outstanding memory access transactions and stops issuing further transactions before issuing a HALT ACKNOWLEDGE signal to the power management unit 402.

The instruction issue logic 202, on the other hand, does not conduct operations which may need to be completed before a transition from the normal mode 502 to the halt mode 504. Accordingly, when the instruction issue logic 202 receives the HALT signal, the instruction issue logic 202 simply stops grouping and issuing instructions. The instruction issue logic 202 does not send a HALT ACKNOWLEDGE signal to the power management unit 402 (and the power management unit 402 does not wait for a HALT ACKNOWLEDGE signal from the instruction issue logic 202).

When the power management unit 402 receives the HALT ACKNOWLEDGE signals from the instruction prefetch unit 200 and the load/store unit 204 indicating they have completed operations that may need to be completed before a transition from the normal mode 502 to the halt mode 504 and have shut down normal operations, the power management unit 402 updates the power mode bits 602 of the SMODE_M0 register 600A to reflect the halt power management mode.

It is noted that, although the processor core 104 completes each pipeline stage during single cycles of the CLOCK signal as indicated in FIG. 3, the instruction prefetch unit 200 and the load/store unit 204 may not generate the HALT ACKNOWLEDGE signals for several cycles of the CLOCK signal following reception of the HALT signal. Accordingly, the SMODE_M0 register 600A may not be updated for several cycles of the CLOCK signal following generation of the HALT signal while waiting for the HALT ACKNOWLEDGE signal from the instruction prefetch unit 200 or the load/store unit 204, or both. After receipt of the HALT ACKNOWLEDGE signals from the instruction prefetch unit 200 and the load/store unit 204, and in the absence of pipeline stalls, the power mode bits 602 of the SMODE_M0 register 600A are updated.

As indicated in FIG. 6A, once updated to reflect the halt power management mode, and absent pipeline stalls, the contents of the SMODE_M0 register 600A are propagated to the SMODE_M1 register 600B during the next cycle of the CLOCK signal, and to the SMODE_EX register 600C during the subsequent cycle of the CLOCK signal. The values of the power mode bits 602 of the SMODE_EX register 600C are driven on input/output pads of the lead vehicle 102, and conveyed as the POWER MODE signal of FIG. 1 to the peripherals 152A and 152B of FIG. 1. The peripherals 152A and 152B may be configured to respond to the POWER MODE signal (e.g., to enter a power mode similar to the current power mode of the processor core 104).

The HALT signal represents a hardware power mode input. A software power mode request by a user involves a software program write operation that modifies the power mode bits 602 of the SMODE register 408. In one embodiment, move and bit manipulation instructions of the instruction set executed by the processor core 104 of FIGS. 1 and 2 may be used to accomplish write operations that modify the power mode bits 602 of the SMODE register 408. In the case of a move instruction that represents a software halt mode request, the AGU0 or AGU1 executing the move instruction sends a signal to the power management unit 402 as indicated in FIG. 4. The control unit 406 monitors the operations of the bit manipulation unit 404 and sends a signal to the power management unit 402 in the case of a bit manipulation instruction that represents a software halt mode request. The power management unit 402 of the pipeline control unit 210 responds to software halt mode requests and the hardware HALT signal similarly.

Transition from Normal Mode to Sleep or Idle Mode

As indicated in FIG. 5, transitions from the normal mode 502 to the sleep mode 506 and the idle mode 508 occur only in response to software power mode requests. As described above, a software power mode request by a user involves a software program write operation that modifies the power mode bits 602 of the SMODE register 408. In one embodiment, move and bit manipulation instructions of the instruction set may be used to accomplish write operations that modify the power mode bits 602 of the SMODE register 408. In the case of a move instruction that represents a software sleep or idle mode request, the AGU0 or AGU1 executing the move instruction sends a signal to the power management unit 402 as indicated in FIG. 4. The control unit 406 monitors the operations of the bit manipulation unit 404 and sends a signal to the power management unit 402 in the case of a bit manipulation instruction that represents a software sleep or idle mode request.

In response to a software sleep or idle mode request, the power management unit 402 of the pipeline control unit 210 responds by issues the HALT signal to the instruction prefetch unit 200, the instruction issue logic 202, and the load/store unit 204 (as described above with regard to the halt mode). As described above, in response to the HALT signal, the instruction prefetch unit 200 completes or aborts any outstanding instruction fetch transactions and stops issuing further transactions before issuing a HALT ACKNOWLEDGE signal to the power management unit 402, and the load/store unit 204 completes any outstanding memory access transactions and stop issuing further transactions before issuing a HALT ACKNOWLEDGE signal to the power management unit 402.

When the power management unit 402 receives the HALT ACKNOWLEDGE signals from the instruction prefetch unit 200 and the load/store unit 204, the power management unit 402 updates the power mode bits 602 of the SMODE_M0 register 600A as described above to reflect the sleep or idle power management mode dependent upon the software power mode request. Once updated to reflect the sleep or idle power management mode, and absent pipeline stalls, the contents of the SMODE_M0 register 600A are propagated to the SMODE_M1 register 600B during the next cycle of the CLOCK signal, and to the SMODE_EX register 600C during the subsequent cycle of the CLOCK signal. The values of the power mode bits 602 of the SMODE_EX register 600C are driven on input/output pads of the lead vehicle 102, and conveyed via signals to the peripherals 152A and 152B. As described above, the peripherals 152A and 152B may be configured to respond to the signals (e.g., to enter a power mode similar to the current power mode of the processor core 104).

General Method for Transitioning from Normal Mode to Another Power Mode

Figure 7A:
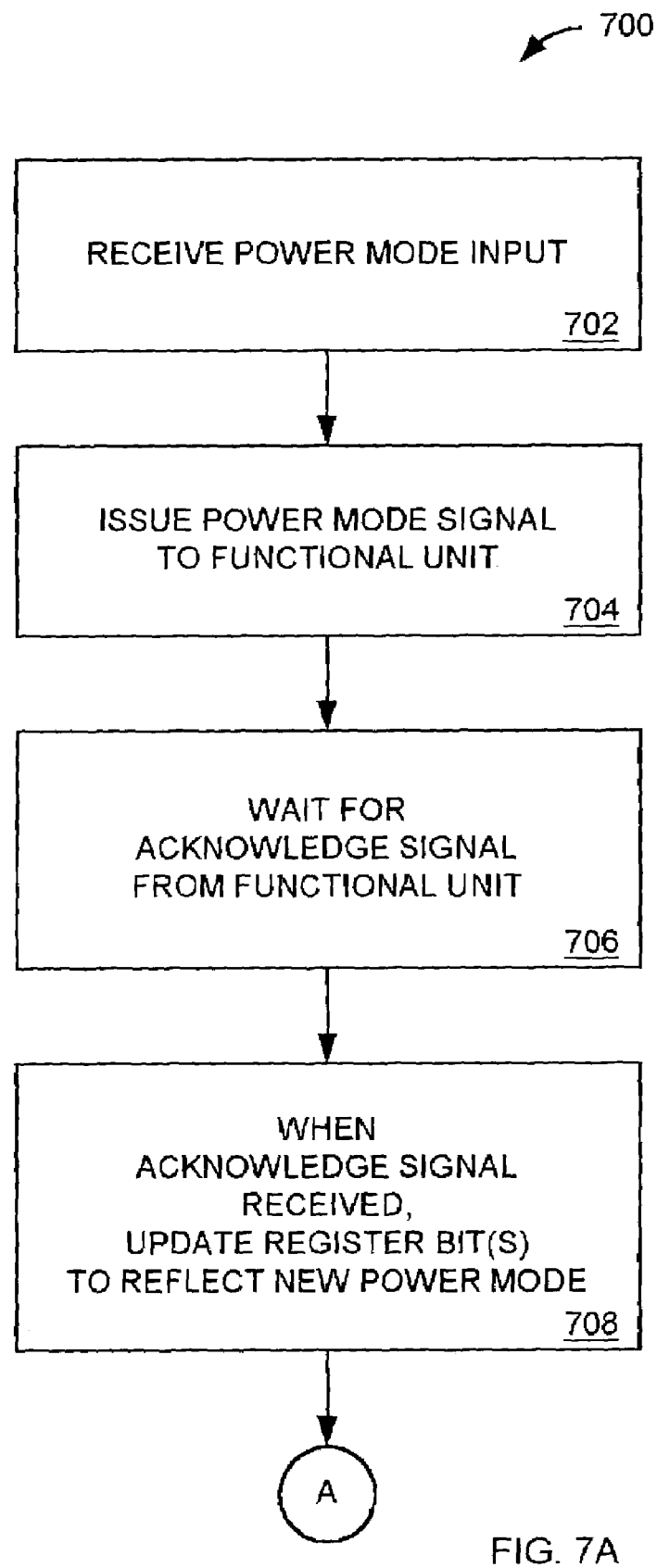
FIGS. 7A and 7B in combination form a flow chart of one embodiment of a method for transitioning from a current power mode to a new power mode.
Figure 7B:
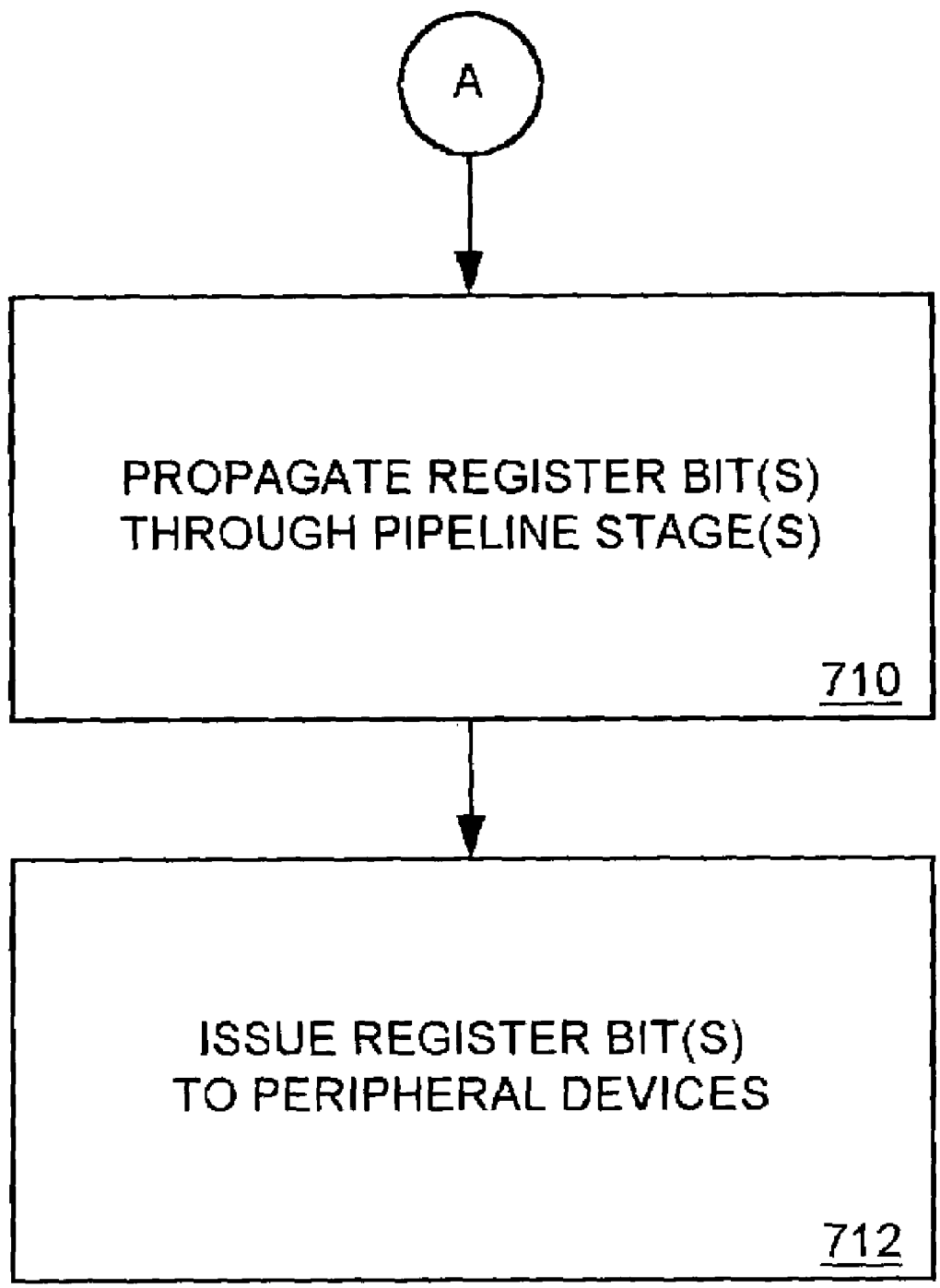

FIGS. 7A and 7B in combination form a flow chart of one embodiment of a method 700 for transitioning from a current electrical power dissipation mode (i.e., a current power mode) to a new power mode (e.g., from a higher power mode to a lower power mode). The method 700 is generally applicable to an electronic system including one or more functional units and implementing an execution pipeline. The method 700 may, for example, be implemented by the power management unit 402 (FIG. 4) of the pipeline control unit 210 (FIGS. 2 and 4) of the processor core 104 of FIG. 1.

During an operation 702 of the method 700, a power mode input is received. The power mode input may be, for example a hardware power mode signal (e.g., a HALT signal) or a software power mode request. As described above, a software power mode request may involve a request for a write operation that modifies one or more bits of a register that represent the current power dissipation mode.

A power mode signal is issued to a functional unit during an operation 704. In response to the power mode signal, the functional unit may, for example, alter its power dissipation and issue an acknowledge signal. For example, the functional unit may complete any operations already in progress (e.g., instruction fetch of memory access transactions), cease initiating new operations, and issue an acknowledge signal. As a result of having ceased operations, the functional unit may have entered a reduced power dissipation state.

An operation 706 of the method 700 involves waiting for the acknowledge signal from the functional unit. As described above, the acknowledge signal may indicate that the functional unit has altered its power dissipation (e.g., reduced its power dissipation). When the acknowledge signal is received, one or more bits of a register are updated to reflect the new power mode during an operation 708.

During an operation 710, the one or more register bits reflecting the new power mode are propagated through one or more stages of a pipeline (e.g., an instruction execution pipeline). The register bits are issued to one or more peripheral devices (e.g., during an execution stage of an instruction execution pipeline) during an operation 712.

It is noted that as the acknowledge signal is in general asynchronous with the instruction execution pipeline, an acknowledge signal received just as the pipeline is entering a stall condition (i.e., is stalling) may need to be preserved. Stall detection and acknowledge signal preservation circuitry located within the power management unit 402 (FIG. 4) of the pipeline control unit 210 (FIGS. 2 and 4) is described below.

Wake Up: Transition from Halt, Sleep, or Idle Mode to Normal Mode

In general, the processor core 104 of FIG. 1 transitions from the halt mode 504 (FIG. 5), the sleep mode 506 (FIG. 5), and the idle mode 508 (FIG. 5) to the normal mode 502 (FIG. 5) in response to a maskable interrupt (IRQ) signal, a non-maskable interrupt (NMI) signal, or the RESET signal. As described above, in response to the RESET signal, the pipeline control unit 210 effects a predefined reset state within the processor core 104 and the lead vehicle 102. The reset state places the processor core 104 in the normal mode 502 (FIG. 5).

In general, when the processor core 104 receives either a maskable interrupt (IRQ) signal, a non-maskable interrupt (NMI) signal, of the RESET signal, the interrupt control unit 400 (FIG. 4) of the pipeline control unit 210 (FIGS. 2 and 4) sends a signal to the power management unit 402 (FIG. 4). In response to the signal, the power management unit 402 changes the values of the bits of the SMODE register 408 (FIGS. 4 and 6A) representing the current power mode to reflect the normal mode 502 (FIG. 5).

In one embodiment using the power mode bit encodings of Table 1 above and including the embodiment of the SMODE register 408 of FIG. 6A, the power management unit 402 changes the values of the bits of the SMODE register 408 (FIGS. 4 and 6A) by clearing the power mode bits 602 of the SMODE_M0 register 600A, the SMODE_M0 register 600B, and the SMODE_EX register 600C in response to the signal from the interrupt control unit 400. The peripherals 152A and 152B of FIG. 1 receive the modified power mode bits 602 as the POWER MODE signal during the next cycle of the CLOCK signal.

As described above with respect to FIG. 5, when the processor core 104 of FIGS. 1 and 2 is in the halt mode 504, the sleep mode 506, or the idle mode 508, the INTERRUPT CLOCK signal is running, and the interrupt control unit 400 of FIG. 4 is active and operating. When the processor core 104 is operating in the halt mode 504 and the interrupt control unit 400 (FIG. 4) receives the non-maskable interrupt (NMI) signal or the RESET signal, the interrupt control unit 400 sends the signal to the power management unit 402 (FIG. 4). In response to the signal, the power management unit 402 changes the values of the bits of the SMODE register 408 (FIGS. 4 and 6A) representing the current power mode to reflect the normal mode 502 (FIG. 5).

When the processor core 104 of FIGS. 1 and 2 is operating in the sleep mode 506 of FIG. 5 and the interrupt control unit 400 (FIG. 4) receives the non-maskable interrupt (NMI) signal or any one of the subset of the maskable interrupt signals or the RESET signal, the interrupt control unit 400 sends the signal to the power management unit 402 (FIG. 4). In response to the signal, the power management unit 402 changes the values of the bits of the SMODE register 408 (FIGS. 4 and 6A) representing the current power mode to reflect the normal mode 502 (FIG. 5).

When the processor core 104 of FIGS. 1 and 2 is operating in the idle mode 508 of FIG. 5 and the interrupt control unit 400 (FIG. 4) receives any interrupt signal or the RESET signal, the interrupt control unit 400 sends the signal to the power management unit 402 (FIG. 4). In response to the signal, the power management unit 402 changes the values of the bits of the SMODE register 408 (FIGS. 4 and 6A) representing the current power mode to reflect the normal mode 502 (FIG. 5).

Particular Embodiments

Figure 8:
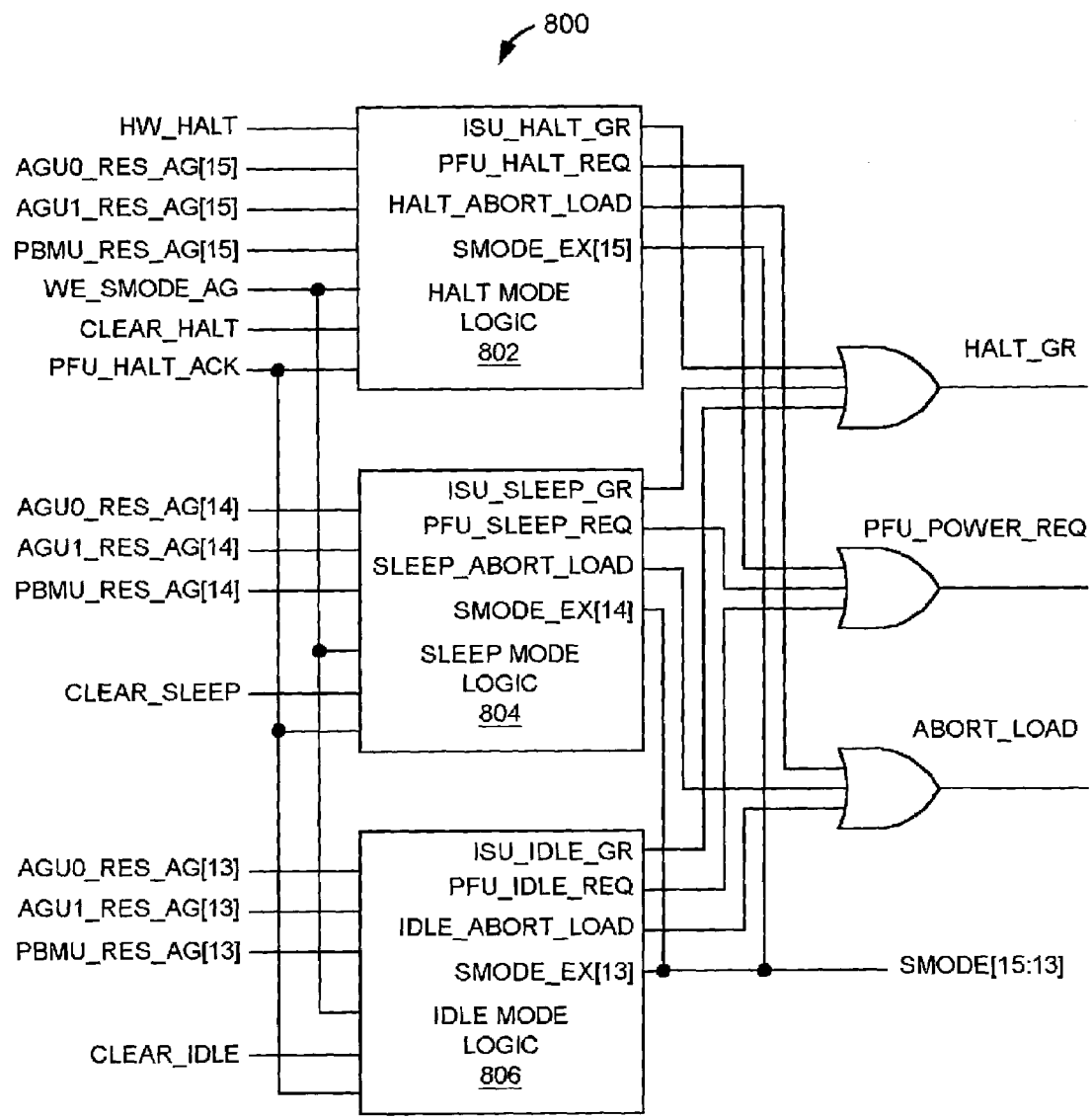
FIG. 8 is a diagram of one embodiment of logic within the power management unit of FIG. 4 implementing the halt, sleep, and idle modes of FIG. 5, wherein the logic includes halt mode logic implementing the halt mode, sleep mode logic implementing the sleep mode, and idle mode logic implementing the idle mode.

FIG. 8 is a diagram of one embodiment of logic 800 within the power management unit 402 (FIG. 4) of the pipeline control unit 210 (FIGS. 2 and 4) of the processor core 104 of FIG. 1 implementing the halt mode 504 of FIG. 5, the sleep mode 506 of FIG. 5, and the idle mode 508 of FIG. 5. In FIG. 8, halt mode logic 802 implements the halt mode 504, sleep mode logic 804 implements the sleep mode 506, and idle mode logic 806 implements the idle mode 508. Table 2 below is a signal table corresponding to FIG. 8:

TABLE 2

Signal Table for the Logic 800 of FIG. 8.

| Signal Name | Description |
| --- | --- |
| HW_HALT | Hardware halt request; asynchronous input. Generated external to the processor core 104 of FIGS. 1-2. Active high; must be held high for a minimum of one cycle of the CLOCK signal. |
| AGU0_RES_AG [15:13] | Result from the AGU0 214A in FIG. 2; input. Provided when the AGU0 214A executes a move instruction that modifies the SMODE register 408 of FIGS. 4 and 6A. |
| AGU1_RES_AG [15:13] | Result from the AGU1 214B in FIG. 2; input. Provided when the AGU1 214B executes a move instruction that modifies the SMODE register 408 of FIGS. 4 and 6A. |
| PBMU_RES_AG [15:13] | Result from the bit manipulation unit 404 of FIG. 4; input. Provided when the bit manipulation unit 404 executes a bit manipulation instruction that modifies the SMODE register 408 of FIGS. 4 and 6A. |
| WE_SMODE_AG | Pipe Control Write Enable; input. Issued by the control unit 406 (FIG. 4) of the pipeline control unit 210 of FIGS. 2 and 4 to a datapath of the pipeline control unit 210. Valid in the address generation (AG) stage. Asserted when the control unit 406 detects a move or bit manipulation instruction that modifies the SMODE register 408 of FIGS. 4 and 6A is executed in the AG stage. In response to this signal, data from either the AGU0 214A of FIG. 2, the AGU1 214B, or the bit manipulation unit 404 of FIG. 4 is loaded into the SMODE register 408 during the next rising edge of the clock. signal CLOCK. |
| CLEAR_HALT | Clear halt bit upon exiting the halt mode; input. When the processor core 104 of FIGS. 1-2 is in the halt mode 504 of FIG. 5, and an NMI is received by the interrupt control unit 400 of FIG. 4, the interrupt control unit 400 sends this signal to clear a halt bit of the power mode bits 602 of the SMODE register 408 of FIGS. 4 and 6A (e.g., halt bits of the SMODE_M0 register 600A, the SMODE_M1 register 600B, and the SMODE_EX register 600C of FIG. 6A). The halt bit is cleared during the next rising edge of the clock signal CLOCK. |
| PFU_HALT_ACK | Halt acknowledge; input from the instruction prefetch unit 200 of FIG. 2. Generated in response to a halt request signal, and after the instruction prefetch unit 200 has completed any outstanding |

TABLE 2-continued

Signal Table for the Logic 800 of FIG. 8.

| Signal Name | Description |
|---|---|
| | transactions. Signals the instruction prefetch unit 200 is ready to enter the halt mode. |
| CLEAR_SLEEP | Clear sleep bit upon exiting the sleep mode; input. When the processor core 104 of FIGS. 1-2 is in the sleep mode 506 of FIG. 5, and the NMI signal or any one of the subset of the maskable interrupt signals is received by the interrupt control unit 400 of FIG. 4, the interrupt control unit 400 sends this signal to clear a sleep bit of the power mode bits 602 of the SMODE register 408 of FIGS. 4 and 6A (e.g., sleep bits of the SMODE_M0 register 600A, the SMODE_M1 register 600B, and the SMODE_EX register 600C of FIG. 6A). The sleep bit is cleared during the next rising edge of the clock signal CLOCK. |
| CLEAR_IDLE | Clear idle bit upon exiting the idle mode; input. When the processor core 104 of FIGS. 1-2 is in the idle mode 508 of FIG. 5, and any interrupt signal is received by the interrupt control unit 400 of FIG. 4, the interrupt control unit 400 sends this signal to clear an idle bit of the power mode bits 602 of the SMODE register 408 of FIGS. 4 and 6A (e.g., idle bits of the SMODE_M0 register 600A, the SMODE_M1 register 600B, and the SMODE_EX register 600C of FIG. 6A). The idle bit is cleared during the next rising edge of the clock signal CLOCK. |
| ISU_HALT_GR | Halt mode request detected in grouping (GR) stage; output to the instruction issue logic 202 of FIG. 2. Indicates a halt request has been detected in the GR stage. In response, the instruction issue logic 202 stops grouping and issuing instructions. |
| PFU_HALT_REQ | Halt mode request detected; output to the instruction prefetch unit 200 of FIG. 2. The prefetch unit 200 responds with the PFU_HALT_ACK signal. |
| HALT_ABORT_LOAD | Abort instruction loads due to halt request; output. Delivered to the instruction prefetch unit 200 of FIG. 2 via the instruction issue logic 202 of FIG. 2. The instruction issue logic 202 combines this signal with other abort load requests, such as conditional branch mispredictions, and sends the resulting signal to the instruction prefetch unit 200. |
| SMODE_EX [15:13] | Power mode bits 602 of the SMODE_EX register 600C of FIG. 6A. |
| ISU_SLEEP_GR | Sleep mode request detected; output to the instruction issue logic 202 of FIG. 2. In response, the instruction issue logic 202 stops grouping and issuing instructions. |
| PFU_SLEEP_REQ | Sleep mode request detected; output to the instruction prefetch unit 200 of FIG. 2. The instruction prefetch unit 200 responds with an acknowledge signal. |
| SLEEP_ABORT_LOAD | Abort instruction loads due to sleep request; output. Delivered to the instruction prefetch unit 200 of FIG. 2 via the instruction issue logic 202 of FIG. 2. The instruction issue logic 202 combines this signal with other abort load requests, such as conditional branch mispredictions, and sends the resulting signal to the instruction prefetch unit 200. |
| ISU_IDLE_GR | Idle mode request detected; output to the instruction issue logic 202 of FIG. 2. In response, the instruction issue logic 202 stops grouping and issuing instructions. |
| PFU_IDLE_REQ | Idle mode request detected; output to the instruction prefetch unit 200 of FIG. 2. The instruction prefetch unit 200 responds with an acknowledge signal. |
| IDLE_ABORT_LOAD | Abort instruction loads due to idle mode request; output to the instruction issue logic 202 of FIG. 2. Delivered to the instruction prefetch unit 200 of FIG. 2 via the instruction issue logic 202. The instruction issue logic 202 combines this signal with other abort load requests, such as conditional branch mispredictions, and sends the resulting signal to the instruction prefetch unit 200. |
| HALT_GR | Halt/Sleep/Idle mode in the grouping (GR) stage; output. Issued to the instruction issue logic 202 of FIG. 2 when a halt mode, sleep mode, or idle mode request is detected. In response, the instruction issue logic 202 stops grouping and issuing instructions. |
| PFU_POWER_REQ | Power management mode enabled; output to the instruction prefetch unit 200 of FIG. 2. Issued when a halt mode, sleep mode, or idle mode request is detected. In response, the instruction prefetch unit 200 halts its operations, stops issuing instruction requests to the memory subsystem (MSS) 106 of FIG. 1, and issues the PFU_HALT_ACK signal. Asserted until the processor core 104 of FIGS. 1 and 2 exits the halt mode, sleep mode, or idle mode. |
| ABORT_LOAD | Power management mode enabled - abort outstanding instruction loads; output to the instruction prefetch unit 200 of FIG. 2. Signals the instruction prefetch unit 200 to abort outstanding instruction |

TABLE 2-continued

Signal Table for the Logic 800 of FIG. 8.

| Signal Name | Description |
|---|---|
| | memory transactions upon entering the halt mode, sleep mode, or idle mode. |

Figure 9A:
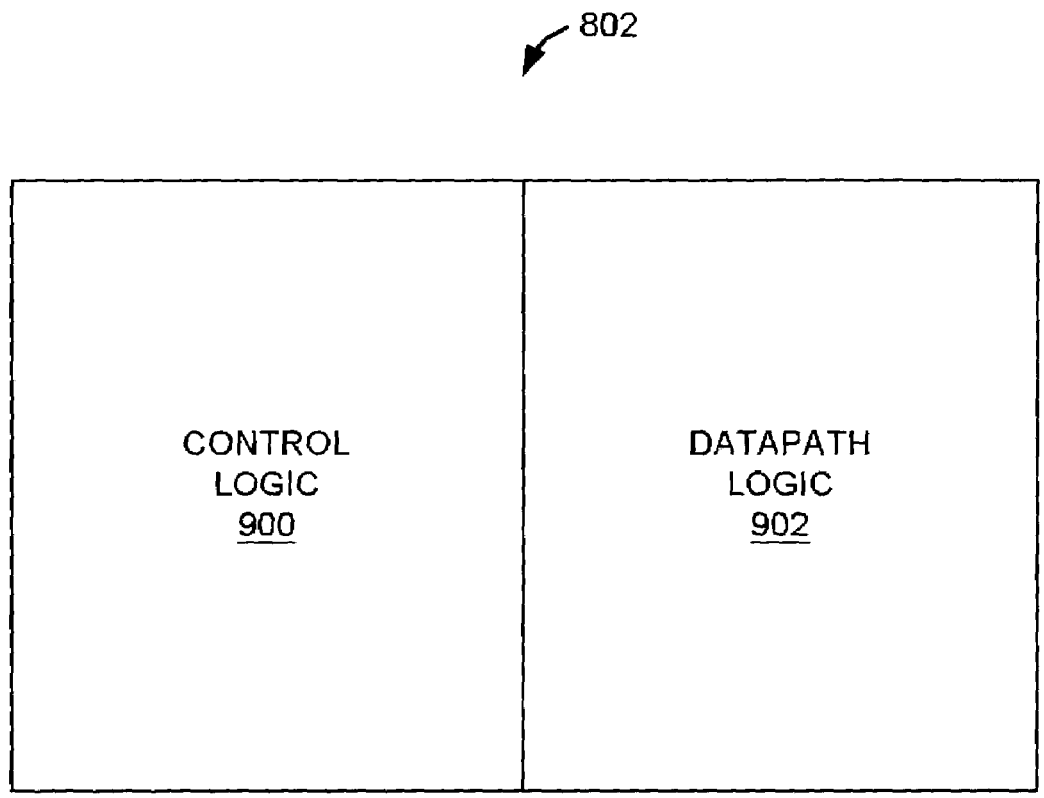
FIG. 9A is a diagram of one embodiment of the halt mode logic of FIG. 8, wherein the halt mode logic includes control logic and datapath logic.
Figure 9B:
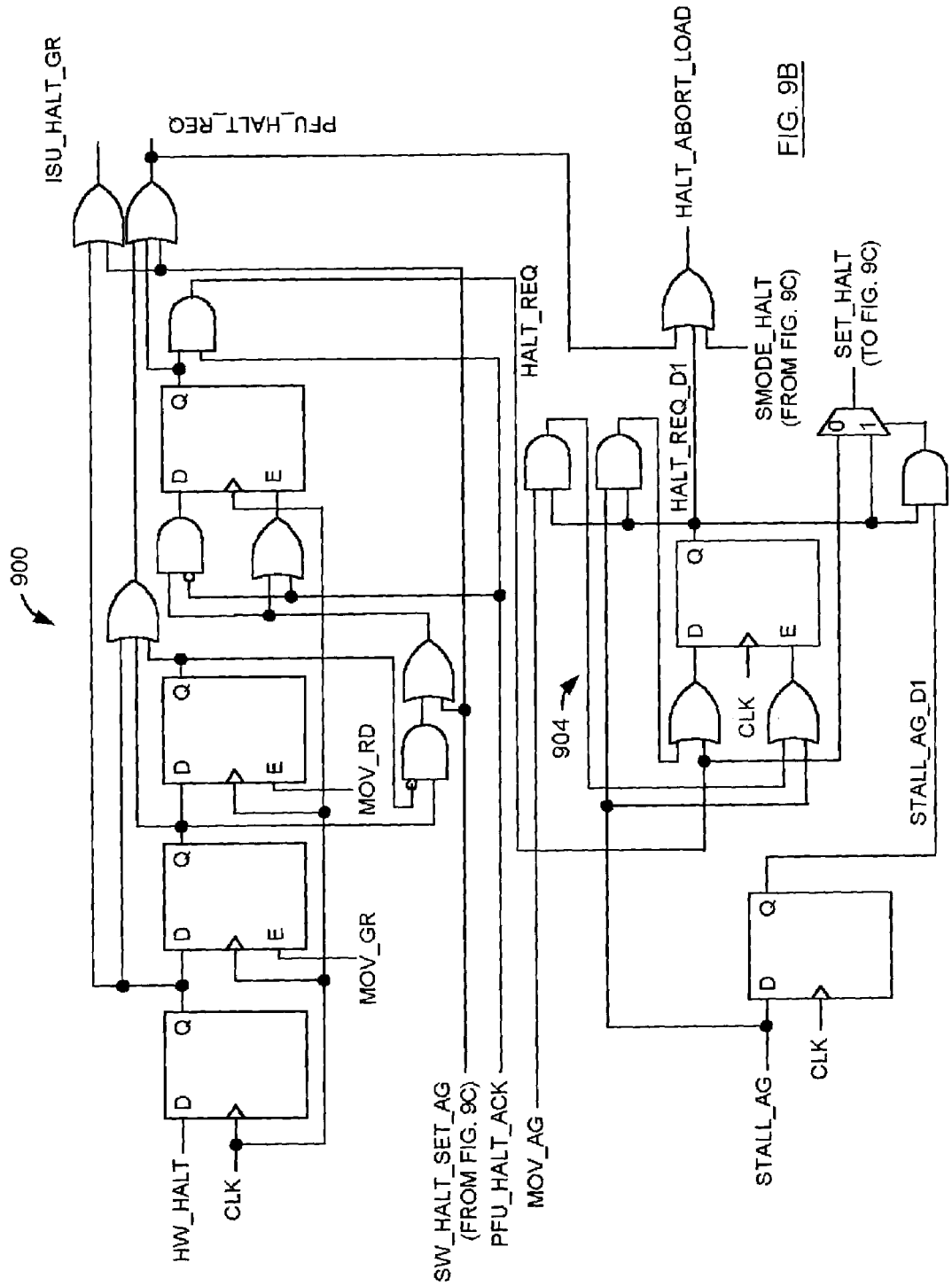
FIG. 9B is a diagram of one embodiment of the control logic of FIG. 9A.

FIG. 9A is a diagram of one embodiment of the halt mode logic 802 of FIG. 8 wherein the halt mode logic 802 includes control logic 900 and datapath logic 902. FIG. 9B is a diagram of one embodiment of the control logic 900 of FIG. 9A. Upon receiving one or more signals representing a halt input, the control logic 900 of FIG. 9B issues the "ISU_HALT_GR" signal to the instruction issue logic 202 of FIG. 2, and the "PFU_HALT_REQ" signal to the instruction prefetch unit 200 of FIG. 2. (See Table 2 above.) In response to the "ISU_HALT_GR" signal, the instruction issue logic 202 stops grouping and issuing instructions. The instruction prefetch unit 200 responds to the "PFU_HALT_REQ" by issuing the "PFU_HALT_ACK" signal as the HALT ACKNOWLEDGE signal after completing any outstanding transactions. The asserted PFU_HALT_ACK signal indicates the instruction prefetch unit 200 is ready to enter the halt mode 504 of FIG. 5.

The power management unit 402 (FIG. 4) of the pipeline control unit 210 (FIGS. 2 and 4) includes stall detection circuitry as described above. In addition, the control logic 900 includes signal preservation circuitry 904 for preserving the HALT ACKNOWLEDGE signal from the instruction prefetch unit 200 of FIG. 2 when the execution pipeline is in a stall condition (i.e., is stalling). The signal preservation circuitry 904 stores the HALT ACKNOWLEDGE signal until the execution pipeline recovers from the stall condition.

Figure 9C:
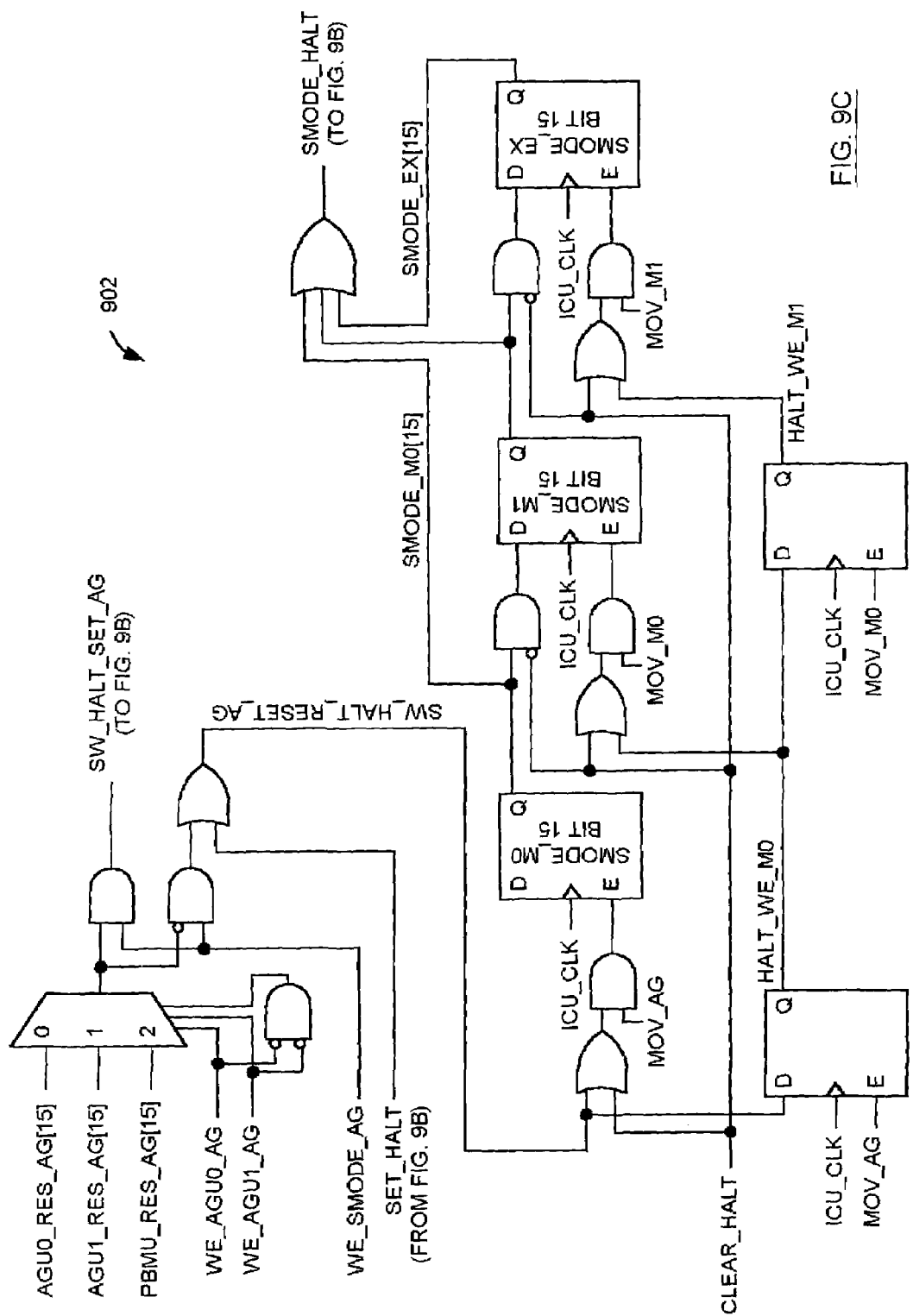
FIG. 9C is a diagram of one embodiment of the datapath logic of FIG. 9A.

FIG. 9C is a diagram of one embodiment of the datapath logic 902 of FIG. 9A. The halt mode logic 802 of FIGS. 9A–9C includes selection logic receiving pre-stall and post-stall inputs. Following an execution pipeline stall, the selection logic selects either the pre-stall input signal or post-stall input, and steers the selected signal to the SMODE_M0 register 600A of FIG. 6A.

The halt mode logic 802 of FIG. 8 may be modified to send a power mode signal similar to the PFU_HALT_REQ signal to the load/store unit 204 of FIG. 2, and wait for a HALT ACKNOWLEDGE signal similar to the PFU_HALT_ACK from the load/store unit 204 before entering the halt mode 504 of FIG. 5.

Figure 10A:
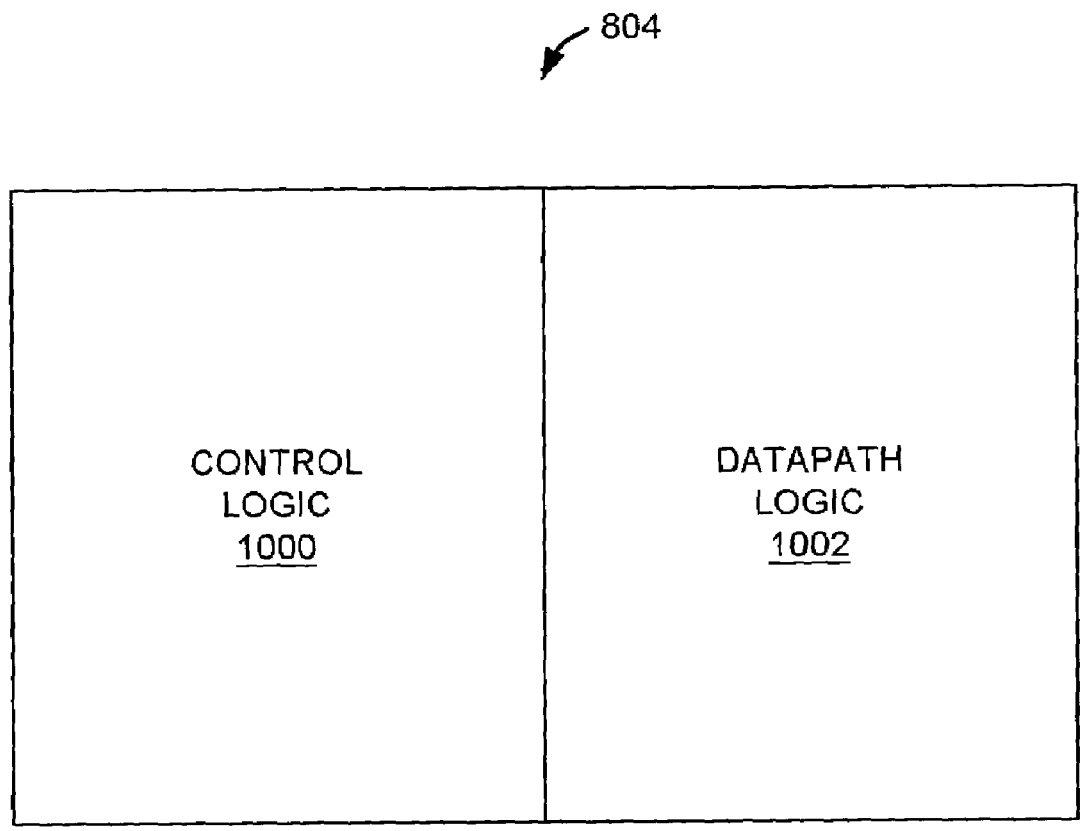
FIG. 10A is a diagram of one embodiment of the sleep mode logic of FIG. 8, wherein the sleep mode logic includes control logic and datapath logic.
Figure 10B:
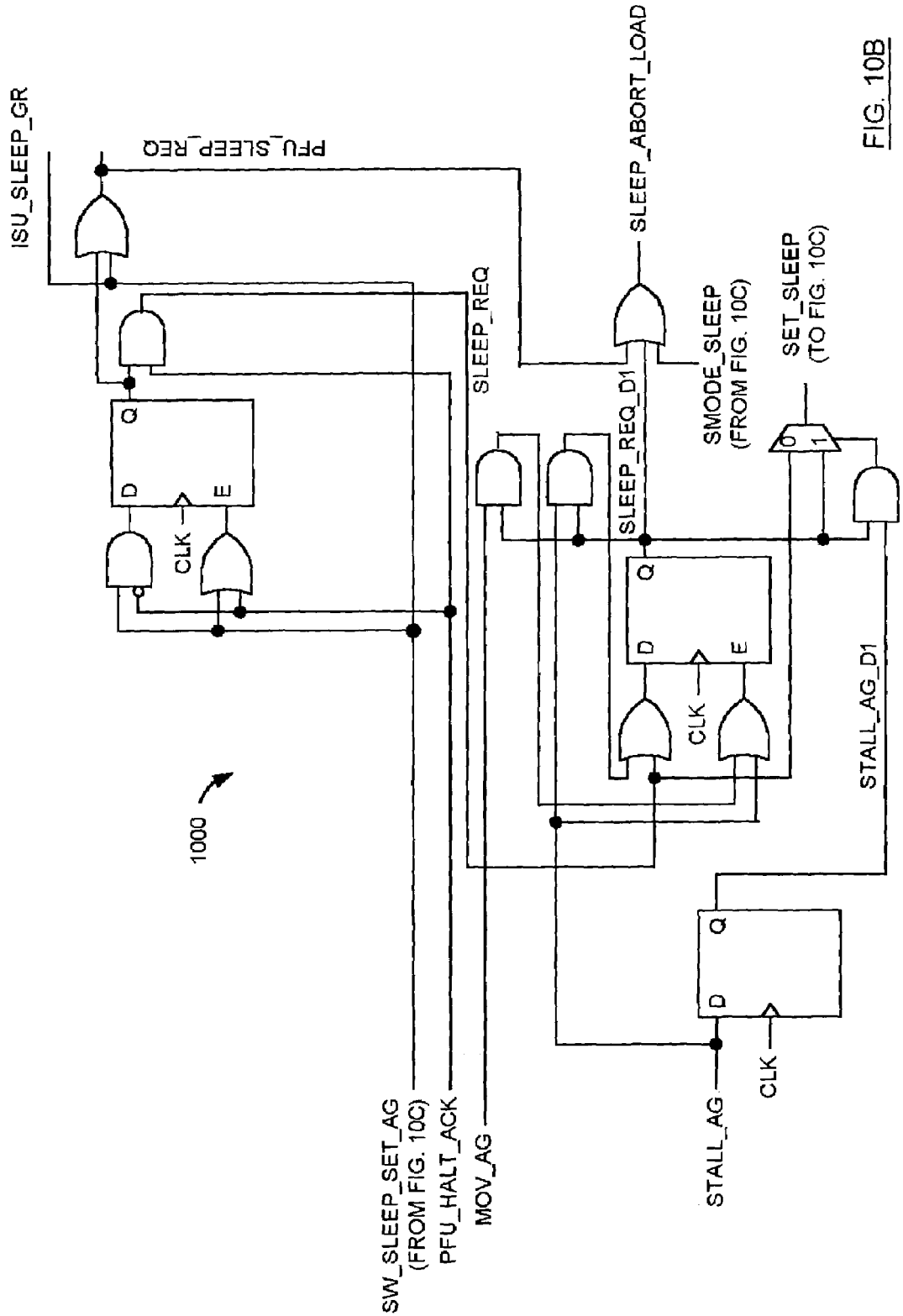
FIG. 10B is a diagram of one embodiment of the control logic of FIG. 10A.
Figure 10C:
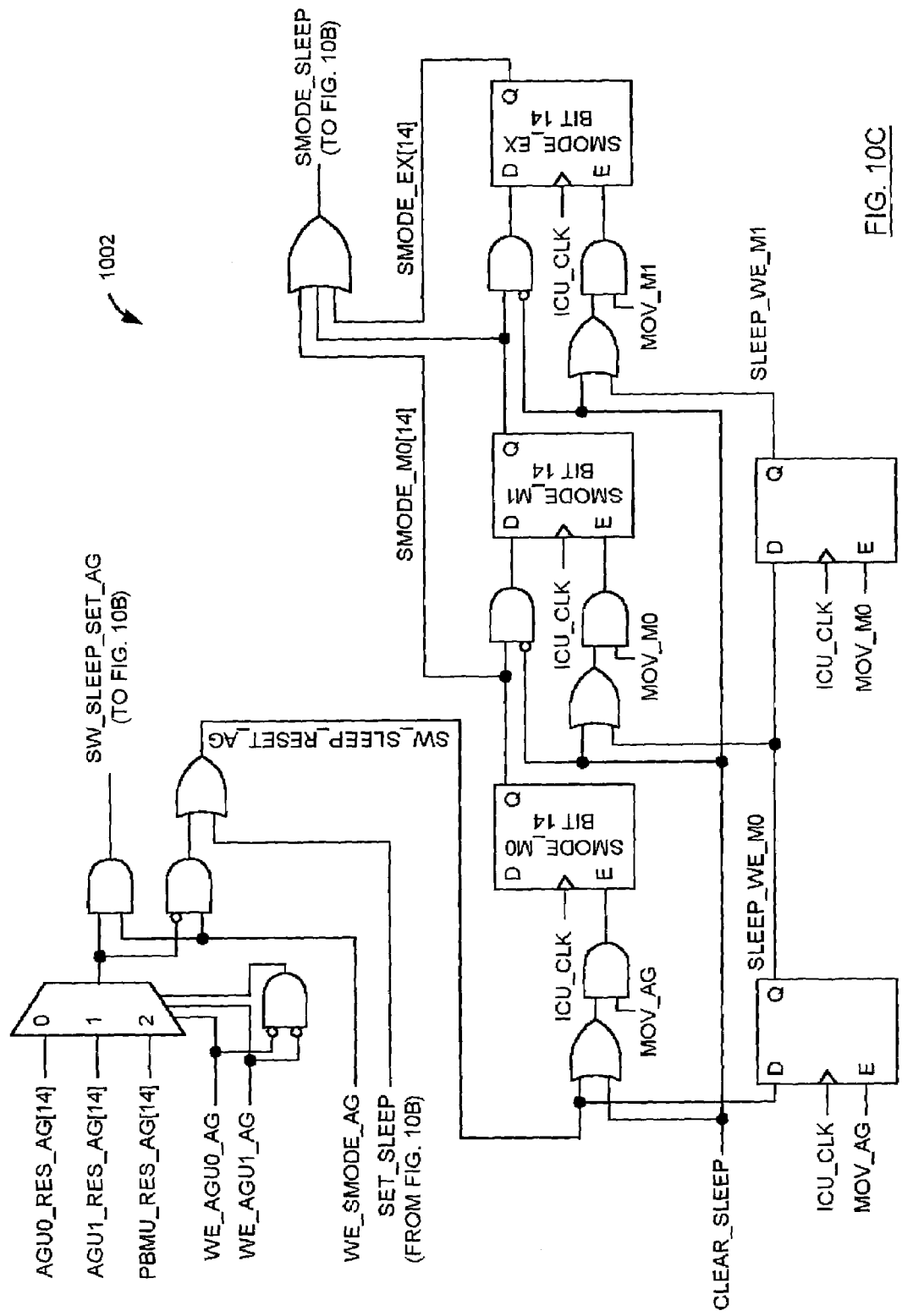
FIG. 10C is a diagram of one embodiment of the datapath logic of FIG. 10A.

FIG. 10A is a diagram of one embodiment of the sleep mode logic 804 of FIG. 8 wherein the sleep mode logic 804 includes control logic 1000 and datapath logic 1002. FIG. 10B is a diagram of one embodiment of the control logic 1000 of FIG. 10A, and FIG. 10C is a diagram of one embodiment of the datapath logic 1002 of FIG. 10A.

Figure 11A:
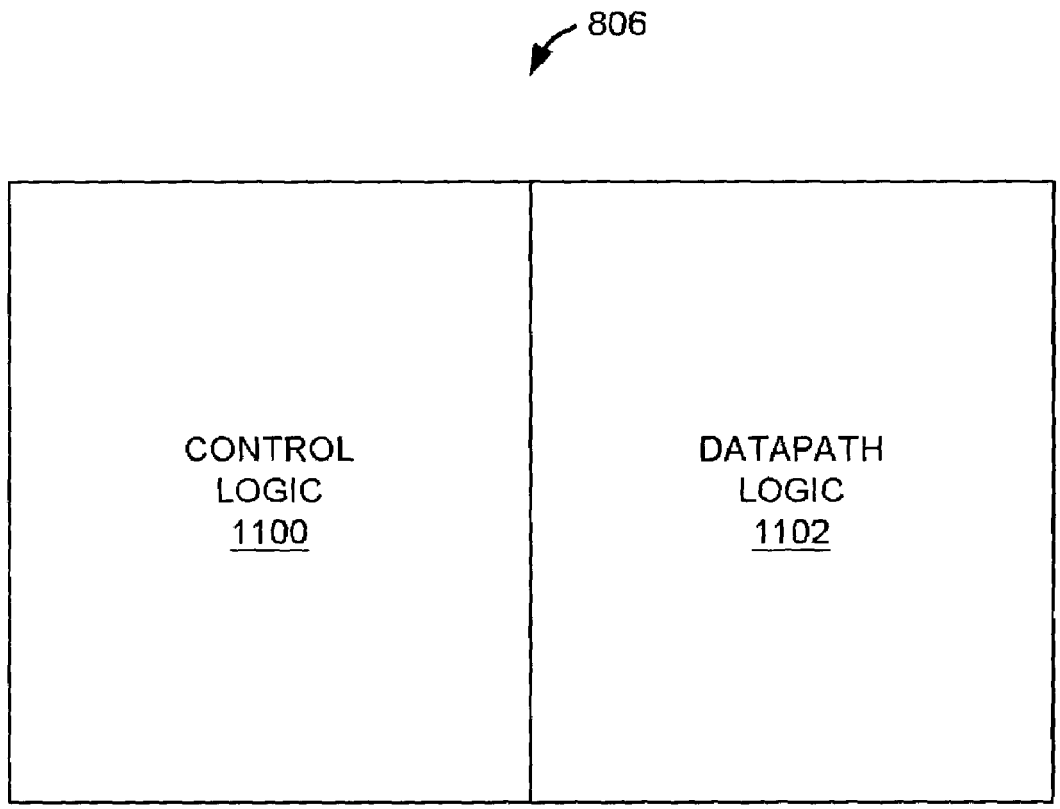
FIG. 11A is a diagram of one embodiment of the idle mode logic of FIG. 8, wherein the idle mode logic includes control logic and datapath logic.
Figure 11B:
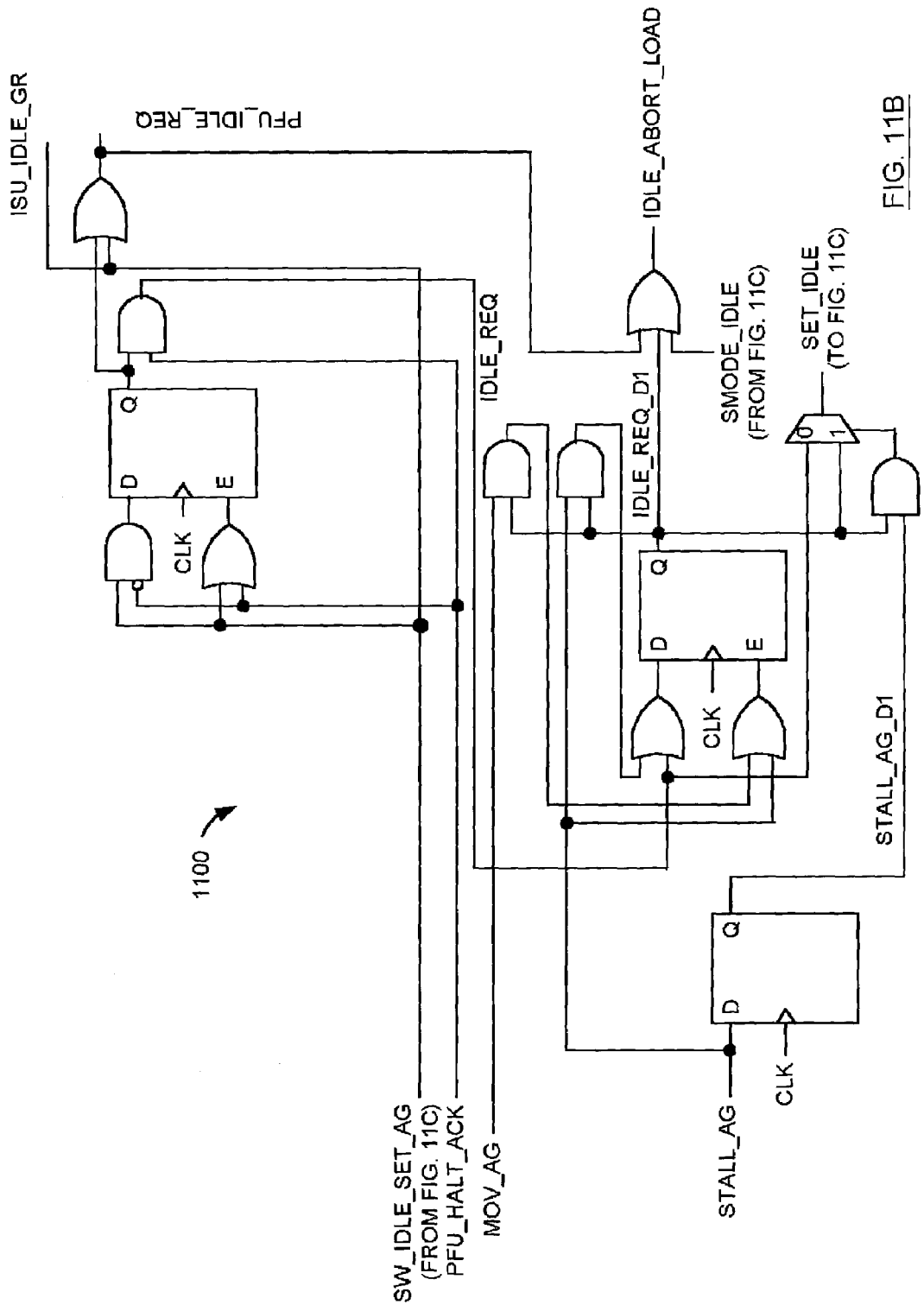
FIG. 11B is a diagram of one embodiment of the control logic of FIG. 11A.
Figure 11C:
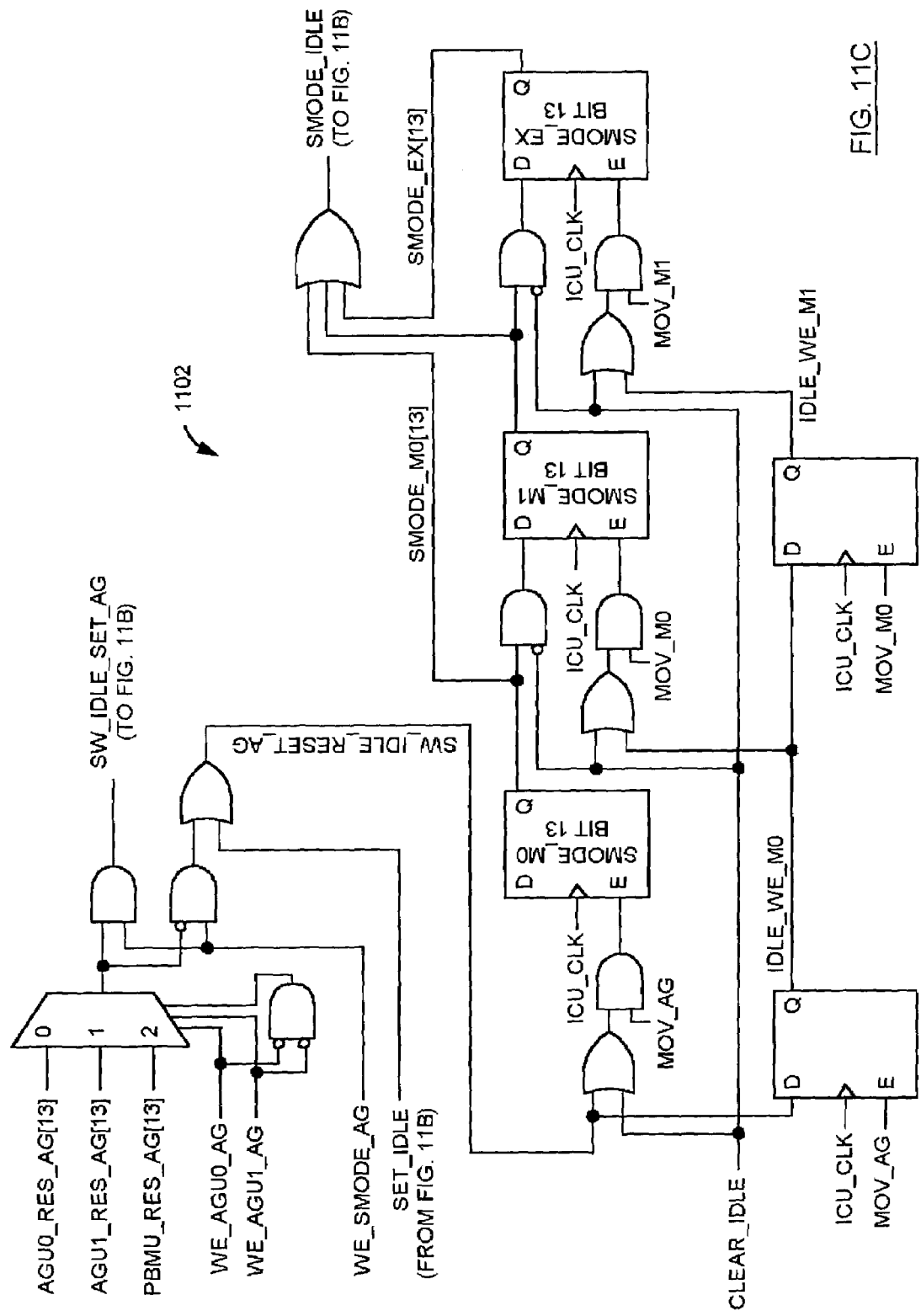
FIG. 11C is a diagram of one embodiment of the datapath logic of FIG. 11A.

FIG. 11A is a diagram of one embodiment of the idle mode logic 806 of FIG. 8 wherein the idle mode logic 806 includes control logic 1100 and datapath logic 1102. FIG. 11B is a diagram of one embodiment of the control logic 1100 of FIG. 11A, and FIG. 11C is a diagram of one embodiment of the datapath logic 1102 of FIG. 11A.

Table 3 below is a signal table describing input signals to the logic of FIGS. 9B–9C, 10B–10C, and 11B–11C not shown in FIG. 8 and described above:

TABLE 3

Signal Table Describing Input Signals to the Logic of FIGS. 9B–9C, 10B–10C, and 11B–11C Not Shown in FIG. 8 and Described Above.

| Signal Name | Description |
|---|---|
| CLK | The clock signal CLOCK of the processor core 104 of FIGS. 1 and 2. Functional units of the processor core 104 (e.g., the instruction prefetch unit 200, the instruction issue logic 202, the pipeline control unit 210, and the load/store unit 204 of FIG. 2) operate using this clock signal in the normal mode 502 of FIG. 5. |
| MOV_AG | Enable signal for memory address 0 (M0) staging flip-flops; asserted in the address generation (AG) stage in the absence of a stall condition. When asserted, address generation (AG) stage signals in cycle n become memory address 0 (M0) stage signals in cycle n+1. |
| STALL_AG | Indicates a stall condition during the address generation (AG) stage. When asserted, the pipeline does not advance. When STALL_AG is asserted, MOV_AG is not, and the memory address 0 (M0) staging flip-flops are not enabled. |
| MOV_GR | Enable signal for operand read (RD) staging flip-flops; asserted in the grouping (GR) stage in the absence of a stall condition. When asserted, grouping (GR) stage signals in cycle n become operand read (RD) stage signals in cycle n+1. |
| MOV_RD | Enable signal for address generation (AG) staging flip-flops; asserted in the operand read (RD) stage in the absence of a stall condition. When asserted, operand read (RD) stage signals in cycle n become address generation (AG) stage signals in cycle n+1. |

TABLE 3-continued

Signal Table Describing Input Signals
to the Logic of FIGS. 9B–9C, 10B–10C, and 11B–11C
Not Shown in FIG. 8 and Described Above.

| Signal Name | Description |
|---|---|
| WE_AGU0_AG | Indicates a control register is written using result data from the AGU0 214A of FIG. 2. The address of the control register is sent separately. For power management purposes, the address is decoded and sent as the WE_SMODE_AG signal for writing to the SMODE register 408 of FIGS. 4 and 6A. |
| WE_AGU1_AG | Indicates a control register is written using result data from the AGU1 214B of FIG. 2. The address of the control register is sent separately. For power management purposes, the address is decoded and sent as the WE_SMODE_AG signal for writing to the SMODE register 408 of FIGS. 4 and 6A. |
| ICU_CLK | Clock signal of the interrupt control unit 400 of FIG. 4. In various power management modes, the ICU_CLK signal continues to run while the CLK signal is stopped. |
| MOV_M0 | Enable signal for memory address 1 (M1) staging flip-flops; asserted in the memory address 0 (M0) stage in the absence of a stall condition. When asserted, memory address 0 (M0) stage signals in cycle n become memory address 1 (M1) stage signals in cycle n+1. |
| MOV_M1 | Enable signal for execution (EX) staging flip-flops; asserted in the memory address 1 (M1) stage in the absence of a stall condition. When asserted, memory address 1 (M1) stage signals in cycle n become execution (EX) stage signals in cycle n+1. |

Figure 12:
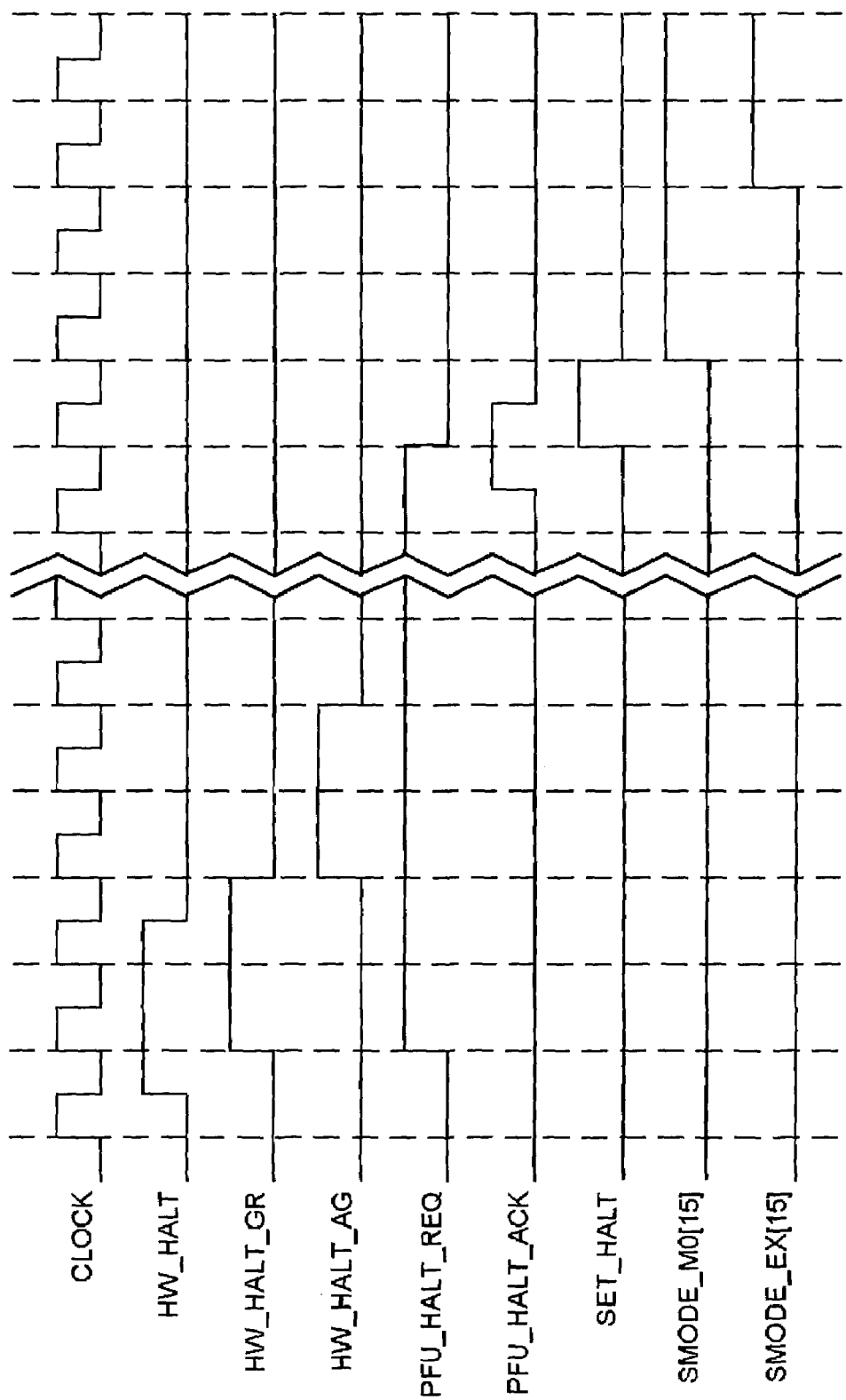
FIG. 12 is a timing diagram describing a handshaking protocol for transitioning from the normal mode of FIG. 5 to the halt mode of FIG. 5.

FIG. 12 is a timing diagram describing the handshaking protocol for transitioning from the normal mode 502 (FIG. 5) to the halt mode 504 (FIG. 5). The timing diagram of FIG. 12 includes signals shown in FIGS. 8 and 9A–9C, and many of the signals are described above in Tables 2 and 3. In FIG. 12, the HW_HALT signal is asserted during a first cycle of the CLOCK signal. The HW_HALT signal (see Table 2) is the HALT signal described above generated external to the processor core 104 of FIGS. 1–2, and is an asynchronous input signal.

During the following (second) cycle of the Clock signal, and in response to the asserted hardware halt request signal HW_HALT, the halt mode logic 802 of FIG. 8 issues the HW_HALT_GRANT signal to the to the instruction issue logic 202 of FIG. 2, and the PFU_HALT_REQ signal to the instruction prefetch unit 200 of FIG. 2. In the embodiment of FIG. 12, the HW_HALT_GRANT signal is asserted for 2 cycles of the CLOCK signal in the grouping (GR) pipeline stage. The PFU_HALT_REQ signal, on the other hand, is asserted until the PFU_HALT_ACK acknowledge signal is received from the instruction prefetch unit 200.

The HW_HALT signal is propagated through the execution pipeline along with instructions and data, and becomes the HW_HALT_AG signal in the address generation (AG) stage of the pipeline. In FIG. 12, the HW_HALT_AG signal is asserted during the fourth cycle of the CLOCK signal.

In response to the PFU_HALT_REQ signal, the instruction prefetch unit 200 of FIG. 2 completes any outstanding transactions as described above, and issues the PFU_HALT_ACK acknowledge signal. In FIG. 12, the instruction prefetch unit 200 issues the PFU_HALT_ACK acknowledge signal a number of cycles after the halt mode logic 802 of FIG. 8 issues the PFU_HALT_REQ signal.

In response to the received the PFU_HALT_ACK acknowledge signal, the halt mode logic 802 of FIG. 8 deasserts the PFU_HALT_REQ signal, and asserts a SET_HALT signal. (See FIGS. 9B and 9C.) During the next cycle of the CLOCK signal, a '1' value is stored in bit 15 of the SMODE_M0 register 600A of FIG. 6A (i.e., "SMODE_M0[15]"), wherein the SMODE_M0[15] represents the halt mode 504 of FIG. 5.

During the next cycle of the CLOCK signal, the pipeline enters the memory address 1 (MI) stage, and the SMODE_M0[15] is transferred to bit 15 of the SMODE_M1 register 600B of FIG. 6A (i.e., "SMODE_M1 [15]"). During a subsequent cycle of the CLOCK signal, the pipeline enters the execution (EX) stage, and the SMODE_M1[15] is transferred to bit 15 of the SMODE_EX register 600C of FIG. 6A (i.e., "SMODE_EX[15]"), and the SMODE_EX[15] is provided to peripheral devices as described above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What we claim as our invention is:

1. A processor, comprising:
   a register configured to store a plurality of bits, wherein at least one of the bits has a value representing a current electrical power dissipation mode of the processor;
   at least one functional unit adapted to receive a power mode signal and configured to respond to the power mode signal by altering its electrical power dissipation and issuing an acknowledge signal; and
   a control unit configured to:
   receive a power mode input representing a request to enter a new electrical power dissipation mode;
   issue the power mode signal in response to the power mode input;
   wait for the acknowledge signal; and respond to the acknowledge signal by modifying the at least one of the bits of the register to reflect the new electrical power dissipation mode.

2. The processor as recited in claim 1, wherein the at least one functional unit is configured to alter its electrical power dissipation in response to the power mode signal by completing any operations in progress and ceasing to initiate new operations.

3. The processor as recited in claim 1, wherein the at least functional unit comprises an instruction prefetch unit configured to obtain instructions from a memory via instruction fetch transactions.

4. The processor as recited in claim 3, wherein the instruction prefetch unit is configured to alter its electrical power dissipation in response to the power mode signal by completing any outstanding instruction fetch transactions and ceasing to initiate new instruction fetch transactions.

5. The processor as recited in claim 1, wherein the at least functional unit comprises a load/store unit configured to read data from and to write data to a memory via memory access transactions.

6. The processor as recited in claim 3, wherein the load/store unit is configured to alter its electrical power dissipation in response to the power mode signal by completing any outstanding memory access transactions and ceasing to initiate new memory access transactions.

7. The processor as recited in claim 1, wherein the processor is configured to implement an instruction execution pipeline comprising a plurality of sequential pipeline stages, and wherein the register comprises a plurality of registers each corresponding to a different one of the pipeline stages, and wherein the registers are coupled in series according to the sequence of pipeline stages such that during a transition from one pipeline stage to another, the contents of the register corresponding to the one pipeline stage is transferred to the register corresponding to the other pipeline stage.

8. The processor as recited in claim 7, wherein the processor is configured to provide the values of the at least one of the bits of a last of the series-coupled registers.

9. The processor as recited in claim 7, wherein the control unit is configured to preserve the acknowledge signal in case of a stall condition in the instruction execution pipeline.

10. The processor as recited in claim 1, wherein the power mode input is a hardware signal.

11. The processor as recited in claim 1, wherein the power mode input is a software power mode request comprising a write operation that modifies the at least one of the bits of the register.

12. The processor as recited in claim 1, wherein the control unit comprises stall detection logic for detecting a stall condition in an instruction execution pipeline, and a storage element for storing the acknowledge signal in the event the acknowledge signal is received just as the instruction execution pipeline enters or is in a stall condition.

13. A method for transitioning from a current electrical power dissipation mode to a new electrical power dissipation mode, comprising:
providing an ordered plurality of registers each configured to store a value specifying an electrical power dissipation mode in a corresponding one of a plurality of sequential stages of a hardware pipeline;
receiving a power mode input representing a request to transitioning to the new electrical power dissipation mode;
issuing a power mode signal to a functional unit in response to the power mode input;
waiting for an acknowledge signal from the functional unit; and
responding to the acknowledge signal by modifying the value stored in a first of the ordered plurality of registers to reflect the new electrical power dissipation mode.

14. The method as recited in claim 13, wherein the power mode input comprises a hardware signal.

15. The method as recited in claim 13, wherein the power mode input comprises a software input.

16. The method as recited in claim 15, wherein the software input comprises a write operation that modifies the value stored in the first register.

17. The method as recited in claim 13, wherein the acknowledge signal indicates that the functional unit has altered its power dissipation.

18. The method as recited in claim 13, further comprising:
propagating the value stored in the first register through the other registers in concert with a flow of data through the corresponding stages of the hardware pipeline; and
providing the value when the value is stored in a last of the registers.

19. The method as recited in claim 13, wherein the providing comprises providing the value to one or more peripheral devices when the value is stored in a last of the registers.

20. The method as recited in claim 13, wherein the ordered plurality of registers comprises a first register corresponding to an address translation stage of the hardware pipeline, a second register corresponding to an operand fetch stage of the hardware pipeline, and a last register corresponding to an execution stage of the hardware pipeline during which the operands are used to perform operations specified by the one or more instructions.

21. A data processing system, comprising:
a peripheral device;
a processor coupled to the peripheral device, comprising:
a register configured to store a plurality of bits, wherein at least one of the bits has a value representing a current electrical power dissipation mode of the processor;
at least one functional unit adapted to receive a power mode signal and configured to respond to the power mode signal by altering its electrical power dissipation and issuing an acknowledge signal; and
a control unit configured to:
receive a power mode input signal representing a request to enter a new
electrical power dissipation mode;
issue the power mode signal in response to the power mode input signal; wait for the acknowledge signal;
respond to the acknowledge signal by modifying the at least one of the bits of the register to reflect the new electrical power dissipation mode; and
provide a signal to the peripheral device indicative of the new electrical power dissipation mode.

* * * * *